(12) United States Patent
Wang et al.

(10) Patent No.: US 11,614,521 B2
(45) Date of Patent: Mar. 28, 2023

(54) LIDAR SCANNER WITH PIVOT PRISM AND MIRROR

(71) Applicant: Innovusion, Inc., Sunnyvale, CA (US)

(72) Inventors: Haosen Wang, Sunnyvale, CA (US); Yimin Li, Cupertino, CA (US)

(73) Assignee: INNOVUSION, INC., Sunnyvale, CA (US)

( * ) Notice: Subject to any disclaimer, the term of this patent is extended or adjusted under 35 U.S.C. 154(b) by 0 days.

(21) Appl. No.: 17/714,995

(22) Filed: Apr. 6, 2022

(65) Prior Publication Data

US 2022/0342044 A1     Oct. 27, 2022

Related U.S. Application Data

(60) Provisional application No. 63/177,846, filed on Apr. 21, 2021.

(51) Int. Cl.
*G01S 7/481*     (2006.01)
*G01S 17/894*     (2020.01)
(Continued)

(52) U.S. Cl.
CPC .......... *G01S 7/4817* (2013.01); *G01S 7/4812* (2013.01); *G01S 17/42* (2013.01); *G01S 17/894* (2020.01); *G01S 17/931* (2020.01)

(58) Field of Classification Search
None
See application file for complete search history.

(56) References Cited

U.S. PATENT DOCUMENTS 3,897,150 A     7/1975     Bridges et al.
4,412,720 A     11/1983     Costa
(Continued)

FOREIGN PATENT DOCUMENTS

CN     1677050 A     10/2005
CN     204758260 U     11/2015
(Continued)

OTHER PUBLICATIONS

Niewola et al., "A novel 3D laser scanner design for variable density scanning", 12th International Workshop on Robot Motion and Control, Niewola et al., Poznan University of Technology, pp. 197-202 (Jul. 2019) (Year: 2019).*

(Continued)

*Primary Examiner* — Eric L Bolda
(74) *Attorney, Agent, or Firm* — Mauriel Kapouytian Woods LLP; Liang Huang

(57) ABSTRACT

A light detection and ranging (LiDAR) scanning system is disclosure. In one embodiment, the system includes an optical refraction device coupled to a first actuator configured to oscillate the optical refraction device. The system further includes a mirror optically coupled to the optical refraction device and coupled to a second actuator configured to oscillate the mirror. The system further includes one or more controllers communicatively coupled to the first and second actuators. The controllers are configured to control oscillation of the optical refraction device and oscillation of the mirror to steer one or more light beams both vertically and horizontally to illuminate one or more objects within a field-of-view, obtain return light, the return light being generated based on the steered one or more light beams illuminating the one or more objects within the field-of-view, and redirect the return light to a collection lens disposed in the system.

28 Claims, 13 Drawing Sheets

(51) Int. Cl.
  *G01S 17/931*    (2020.01)
  *G01S 17/42*    (2006.01)

(56) References Cited

U.S. PATENT DOCUMENTS

| | | | |
|---|---|---|---|
| 4,464,048 A | 8/1984 | Farlow | |
| 4,581,649 A * | 4/1986 | Morokawa | H04N 5/349 348/E5.081 |
| 4,685,775 A * | 8/1987 | Goodman | H01L 21/67259 359/225.1 |
| 4,862,257 A | 8/1989 | Ulich | |
| 5,006,721 A | 4/1991 | Cameron et al. | |
| 5,157,451 A | 10/1992 | Taboada et al. | |
| 5,303,084 A | 4/1994 | Pflibsen et al. | |
| 5,319,434 A | 6/1994 | Croteau et al. | |
| 5,369,661 A | 11/1994 | Yamaguchi et al. | |
| 5,442,358 A | 8/1995 | Keeler et al. | |
| 5,546,188 A | 8/1996 | Wangler et al. | |
| 5,579,153 A | 11/1996 | Laming et al. | |
| 5,657,077 A | 8/1997 | Deangelis et al. | |
| 5,793,491 A | 8/1998 | Wangler et al. | |
| 5,838,239 A | 11/1998 | Stern et al. | |
| 5,864,391 A | 1/1999 | Hosokawa et al. | |
| 5,926,259 A | 7/1999 | Bamberger et al. | |
| 5,936,756 A | 8/1999 | Nakajima | |
| 6,163,378 A | 12/2000 | Khoury | |
| 6,317,202 B1 | 11/2001 | Hosokawa et al. | |
| 6,594,000 B2 | 7/2003 | Green et al. | |
| 6,650,404 B1 | 11/2003 | Crawford | |
| 6,788,445 B2 | 9/2004 | Goldberg et al. | |
| 6,950,733 B2 | 9/2005 | Stopczynski | |
| 7,128,267 B2 | 10/2006 | Reichenbach et al. | |
| 7,202,941 B2 | 4/2007 | Munro | |
| 7,345,271 B2 | 3/2008 | Boehlau et al. | |
| 7,440,084 B2 | 10/2008 | Kane | |
| 7,440,175 B2 | 10/2008 | Di Teodoro et al. | |
| 7,489,865 B2 | 2/2009 | Varshneya et al. | |
| 7,576,837 B2 | 8/2009 | Liu et al. | |
| 7,830,527 B2 | 11/2010 | Chen et al. | |
| 7,835,068 B1 | 11/2010 | Brooks et al. | |
| 7,847,235 B2 | 12/2010 | Krupkin et al. | |
| 7,869,112 B2 | 1/2011 | Borchers et al. | |
| 7,936,448 B2 | 5/2011 | Albuquerque et al. | |
| 7,969,558 B2 | 6/2011 | Hall | |
| 7,982,861 B2 | 7/2011 | Abshire et al. | |
| 8,072,582 B2 | 12/2011 | Meneely | |
| 8,471,895 B2 | 6/2013 | Banks | |
| 8,736,818 B2 | 5/2014 | Weimer et al. | |
| 8,749,764 B2 | 6/2014 | Hsu | |
| 8,812,149 B2 | 8/2014 | Doak | |
| 8,848,174 B2 | 9/2014 | Scott et al. | |
| 8,994,928 B2 | 3/2015 | Shiraishi | |
| 9,048,616 B1 | 6/2015 | Robinson | |
| 9,065,243 B2 | 6/2015 | Asobe et al. | |
| 9,067,059 B2 | 6/2015 | Bissig et al. | |
| 9,086,273 B1 | 7/2015 | Gruver et al. | |
| 9,194,701 B2 | 11/2015 | Bosch | |
| 9,255,790 B2 | 2/2016 | Zhu | |
| 9,300,321 B2 | 3/2016 | Zalik et al. | |
| 9,304,316 B2 | 4/2016 | Weiss et al. | |
| 9,316,724 B2 | 4/2016 | Gehring et al. | |
| 9,354,485 B2 | 5/2016 | Fermann et al. | |
| 9,510,505 B2 | 12/2016 | Halloran et al. | |
| 9,575,184 B2 | 2/2017 | Gilliland et al. | |
| 9,605,998 B2 | 3/2017 | Nozawa | |
| 9,621,876 B2 | 4/2017 | Federspiel | |
| 9,638,799 B2 | 5/2017 | Goodwin et al. | |
| 9,696,426 B2 | 7/2017 | Zuk | |
| 9,702,966 B2 | 7/2017 | Batcheller et al. | |
| 9,804,264 B2 | 10/2017 | Villeneuve et al. | |
| 9,810,786 B1 | 11/2017 | Welford et al. | |
| 9,812,838 B2 | 11/2017 | Villeneuve et al. | |
| 9,823,353 B2 | 11/2017 | Eichenholz et al. | |
| RE46,672 E | 1/2018 | Hall | |
| 9,857,468 B1 | 1/2018 | Eichenholz et al. | |
| 9,869,754 B1 | 1/2018 | Campbell et al. | |
| 9,880,263 B2 | 1/2018 | Droz et al. | |
| 9,880,278 B2 | 1/2018 | Uffelen et al. | |
| 9,885,778 B2 | 2/2018 | Dussan | |
| 9,897,689 B2 | 2/2018 | Dussan | |
| 9,915,726 B2 | 3/2018 | Bailey et al. | |
| 9,927,915 B2 | 3/2018 | Frame et al. | |
| 9,958,545 B2 | 5/2018 | Eichenholz et al. | |
| 10,007,001 B1 | 6/2018 | LaChapelle et al. | |
| 10,012,732 B2 | 7/2018 | Eichenholz et al. | |
| 10,031,214 B2 | 7/2018 | Rosenzweig et al. | |
| 10,042,159 B2 | 8/2018 | Dussan et al. | |
| 10,061,019 B1 | 8/2018 | Campbell et al. | |
| 10,073,166 B2 | 9/2018 | Dussan | |
| 10,078,133 B2 | 9/2018 | Dussan | |
| 10,094,925 B1 | 10/2018 | LaChapelle | |
| 10,157,630 B2 | 12/2018 | Vaughn et al. | |
| 10,191,155 B2 | 1/2019 | Curatu | |
| 10,215,847 B2 | 2/2019 | Scheim et al. | |
| 10,267,898 B2 | 4/2019 | Campbell et al. | |
| 10,295,656 B1 | 5/2019 | Li et al. | |
| 10,310,058 B1 | 6/2019 | Campbell et al. | |
| 10,324,170 B1 | 6/2019 | Engberg, Jr. et al. | |
| 10,324,185 B2 | 6/2019 | McWhirter et al. | |
| 10,393,877 B2 | 8/2019 | Hall et al. | |
| 10,429,495 B1 | 10/2019 | Wang et al. | |
| 10,444,356 B2 | 10/2019 | Wu et al. | |
| 10,451,716 B2 | 10/2019 | Hughes et al. | |
| 10,466,342 B1 | 11/2019 | Zhu et al. | |
| 10,502,831 B2 | 12/2019 | Eichenholz | |
| 10,509,112 B1 | 12/2019 | Pan | |
| 10,520,602 B2 | 12/2019 | Villeneuve et al. | |
| 10,557,923 B2 | 2/2020 | Watnik et al. | |
| 10,564,266 B2 | 2/2020 | O'Keeffe | |
| 10,571,567 B2 | 2/2020 | Campbell et al. | |
| 10,578,720 B2 | 3/2020 | Hughes et al. | |
| 10,591,600 B2 | 3/2020 | Villeneuve et al. | |
| 10,627,491 B2 | 4/2020 | Hall et al. | |
| 10,641,872 B2 | 5/2020 | Dussan et al. | |
| 10,663,564 B2 | 5/2020 | LaChapelle | |
| 10,663,585 B2 | 5/2020 | McWhirter | |
| 10,663,596 B2 | 5/2020 | Dussan et al. | |
| 10,684,360 B2 | 6/2020 | Campbell | |
| 10,908,262 B2 | 2/2021 | Dussan | |
| 10,908,265 B2 | 2/2021 | Dussan | |
| 10,908,268 B2 | 2/2021 | Zhou et al. | |
| 10,969,475 B2 | 4/2021 | Li et al. | |
| 10,983,218 B2 | 4/2021 | Hall et al. | |
| 11,002,835 B2 | 5/2021 | Pan et al. | |
| 11,009,605 B2 | 5/2021 | Li et al. | |
| 11,022,679 B2 | 6/2021 | Abari et al. | |
| 11,194,048 B1 | 12/2021 | Burbank et al. | |
| 2002/0136251 A1 | 9/2002 | Green et al. | |
| 2003/0035188 A1 | 2/2003 | Tominaga et al. | |
| 2004/0135992 A1 | 7/2004 | Munro | |
| 2005/0033497 A1 | 2/2005 | Stopczynski | |
| 2005/0190424 A1 | 9/2005 | Reichenbach et al. | |
| 2005/0195383 A1 | 9/2005 | Breed et al. | |
| 2006/0071846 A1 | 4/2006 | Yanagisawa et al. | |
| 2006/0132752 A1 | 6/2006 | Kane | |
| 2007/0091948 A1 | 4/2007 | Di Teodoro et al. | |
| 2007/0216995 A1 | 9/2007 | Bollond et al. | |
| 2008/0174762 A1 | 7/2008 | Liu et al. | |
| 2008/0193135 A1 | 8/2008 | Du et al. | |
| 2009/0010644 A1 | 1/2009 | Varshneya et al. | |
| 2009/0051926 A1 | 2/2009 | Chen | |
| 2009/0059201 A1 | 3/2009 | Willner et al. | |
| 2009/0067453 A1 | 3/2009 | Mizuuchi et al. | |
| 2009/0147239 A1 | 6/2009 | Zhu | |
| 2009/0262760 A1 | 10/2009 | Krupkin et al. | |
| 2009/0316134 A1 | 12/2009 | Michael et al. | |
| 2010/0006760 A1 | 1/2010 | Lee et al. | |
| 2010/0020306 A1 | 1/2010 | Hall | |
| 2010/0020377 A1 | 1/2010 | Brochers et al. | |
| 2010/0027602 A1 | 2/2010 | Abshire et al. | |
| 2010/0045965 A1 | 2/2010 | Meneely | |
| 2010/0053715 A1 | 3/2010 | O'Neill et al. | |
| 2010/0128109 A1 | 5/2010 | Banks | |
| 2010/0271614 A1 | 10/2010 | Albuquerque et al. | |

(56) References Cited

U.S. PATENT DOCUMENTS

| | | |
|---|---|---|
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0241762 A1 | 9/2013 | Smith et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0113200 A1* | 4/2018 | Steinberg ............... G01S 17/42 |
| 2018/0152691 A1 | 5/2018 | Pacala et al. |
| 2018/0156896 A1 | 6/2018 | O'Keeffe |
| 2018/0158471 A1 | 6/2018 | Vaughn et al. |
| 2018/0164439 A1 | 6/2018 | Droz et al. |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0259626 A1* | 9/2018 | Spector ............... G01S 17/10 |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0011538 A1* | 1/2019 | Schwarz ............... G01S 17/42 |
| 2019/0025428 A1 | 1/2019 | Li et al. |
| 2019/0107607 A1 | 4/2019 | Danziger |
| 2019/0107622 A1 | 4/2019 | Andersson |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0227149 A1* | 7/2019 | Altmann ............... G01S 17/933 |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0200880 A1 | 6/2020 | Stoppel |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |
| 2021/0103034 A1 | 4/2021 | Kirillov |
| 2022/0075035 A1* | 3/2022 | Liu .................. G01S 17/32 |

FOREIGN PATENT DOCUMENTS

| | | |
|---|---|---|
| CN | 204885804 U | 12/2015 |
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| EP | 0 757 257 B1 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1185322 A | 3/1970 |
| GB | 1 427 164 A | 3/1976 |
| GB | 2000411 | 1/1979 |
| JP | 2007144667 A | 6/2007 |
| JP | 2010035385 A | 2/2010 |
| JP | 2017-003347 A | 1/2017 |
| JP | 2017-138301 A | 8/2017 |

(56) References Cited

FOREIGN PATENT DOCUMENTS

| | | |
|---|---|---|
| KR | 10-2012-0013515 A | 2/2012 |
| KR | 10-2013-0068224 A | 6/2013 |
| KR | 10-2018-0107673 A | 10/2018 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019154466 A1 | 8/2019 |
| WO | 2019165095 | 8/2019 |
| WO | 2019165289 A1 | 8/2019 |
| WO | 2019165294 | 8/2019 |
| WO | 2020013890 A2 | 1/2020 |
| WO | 2020049055 A1 | 3/2020 |

OTHER PUBLICATIONS

"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.
Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS-OCDMA," pp. Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
Notice of Allowance issued in Korean Patent Application No. 10-2021-7041437 dated Apr. 28, 2022, 6 pages.
Communication Relating to the Results of the Partial International Search, dated Jan. 24, 2023, for International Application No. PCT/US2022/024706, 8 pages.

* cited by examiner

Optical refraction device and mirror movement profile

LIDAR SCANNER WITH PIVOT PRISM AND MIRROR

CROSS-REFERENCE TO RELATED APPLICATIONS

This application claims priority to U.S. Provisional Patent Application Ser. No. 63/177,846, filed Apr. 21, 2021, entitled "LIDAR SCANNER WITH PIVOT PRISM AND MIRROR," the content of which is hereby incorporated by reference for all purposes.

FIELD OF THE TECHNOLOGY

This disclosure relates generally to optical scanning and, more particularly, to a compact LiDAR system that uses an optical refraction device.

BACKGROUND

Light detection and ranging (LiDAR) systems use light pulses to create an image or point cloud of the external environment. Some typical LiDAR systems include a light source, a light transmitter, a light steering system, and a light detector. The light source generates a light beam that is directed by the light steering system in particular directions when being transmitted from the LiDAR system. When a transmitted light beam is scattered by an object, a portion of the scattered light returns to the LiDAR system as a return light pulse. The light detector detects the return light pulse. Using the difference between the time that the return light pulse is detected and the time that a corresponding light pulse in the light beam is transmitted, the LiDAR system can determine the distance to the object using the speed of light. The light steering system can direct light beams along different paths to allow the LiDAR system to scan the surrounding environment and produce images or point clouds. LiDAR systems can also use techniques other than time-of-flight and scanning to measure the surrounding environment.

SUMMARY

Embodiments of the present disclosure comprise steering mechanisms of a compact LiDAR system. A steering mechanism includes an optical refraction device and an optical reflection device (e.g., a mirror). By controlling the optical refraction device and the optical reflection device to oscillate, instead of rotating, the dimension of the steering mechanism can be reduced, thereby making the LiDAR system more compact. The reduced dimension of the steering mechanism makes the LiDAR system, or at least a portion of it, easier to fit into small spaces in a vehicle or another platform. These small spaces may include, for example, a rearview mirror, a vehicle corner, a camera assembly, etc. Moreover, the movement profiles of the optical refraction device and the optical reflection device can be configured such that the two devices move in an alternating manner with respect to each other to obtain flat scanlines in both the horizontal and vertical scanning directions. Flat scanlines are oftentimes desired in the subsequent processing of the LiDAR scanlines (e.g., a perception process). Furthermore, position feedbacks are provided for controlling the optical refraction device and the optical reflection device in real time. Therefore, their respective movement profiles can be adjusted or compensated to improve the position accuracy of both devices. As a result, the overall performance of the LiDAR system is improved.

In one embodiment, the present disclosure provides a light detection and ranging (LiDAR) scanning system. The system includes an optical refraction device coupled to a first actuator configured to oscillate the optical refraction device. The system further includes a mirror optically coupled to the optical refraction device and coupled to a second actuator configured to oscillate the mirror. The system further includes one or more controllers communicatively coupled to the first and second actuators. The controllers are configured to control oscillation of the optical refraction device and oscillation of the mirror to steer one or more light beams both vertically and horizontally to illuminate one or more objects within a field-of-view, obtain return light, the return light being generated based on the steered one or more light beams illuminating the one or more objects within the field-of-view, and redirect the return light to a collection lens disposed in the system.

In one embodiment, the present disclosure provides a controller device of a light detection and ranging (LiDAR) scanning system. The controller device includes one or more processors; memory; and processor-executable instructions stored in memory. The processor-executable instructions comprising instructions, when executed by the one or more processors, cause the controller device to perform processing of controlling a first actuator to oscillate an optical refraction device based on a first movement profile of the optical refraction device. The controller device is further caused to perform processing of controlling a second actuator to oscillate a mirror based on a second movement profile of the mirror. The optical refraction device and the mirror are controlled to steer one or more light beams both vertically and horizontally to illuminate one or more objects within a field-of-view, obtain return light, the return light being generated based on the steered one or more light beams illuminating the one or more objects within the field-of-view, and redirect the return light to a collection lens disposed in the LiDAR scanning system.

In one embodiment, a method for controlling a light detection and ranging (LiDAR) scanning system is disclosed. The method is performed by one or more processors and memory. The method comprises controlling a first actuator to oscillate an optical refraction device based on a first movement profile of the optical refraction device. The method further comprises controlling a second actuator to oscillate a mirror based on a second movement profile of the mirror. The optical refraction device and the mirror are controlled to steer one or more light beams both vertically and horizontally to illuminate one or more objects within a field-of-view, obtain return light, the return light being generated based on the steered one or more light beams illuminating the one or more objects within the field-of-view, and redirect the return light to a collection lens disposed in the LiDAR scanning system.

BRIEF DESCRIPTION OF THE DRAWINGS

The present application can be best understood by reference to the figures described below taken in conjunction with the accompanying drawing figures, in which like parts may be referred to by like numerals.

DETAILED DESCRIPTION

Figure 1:
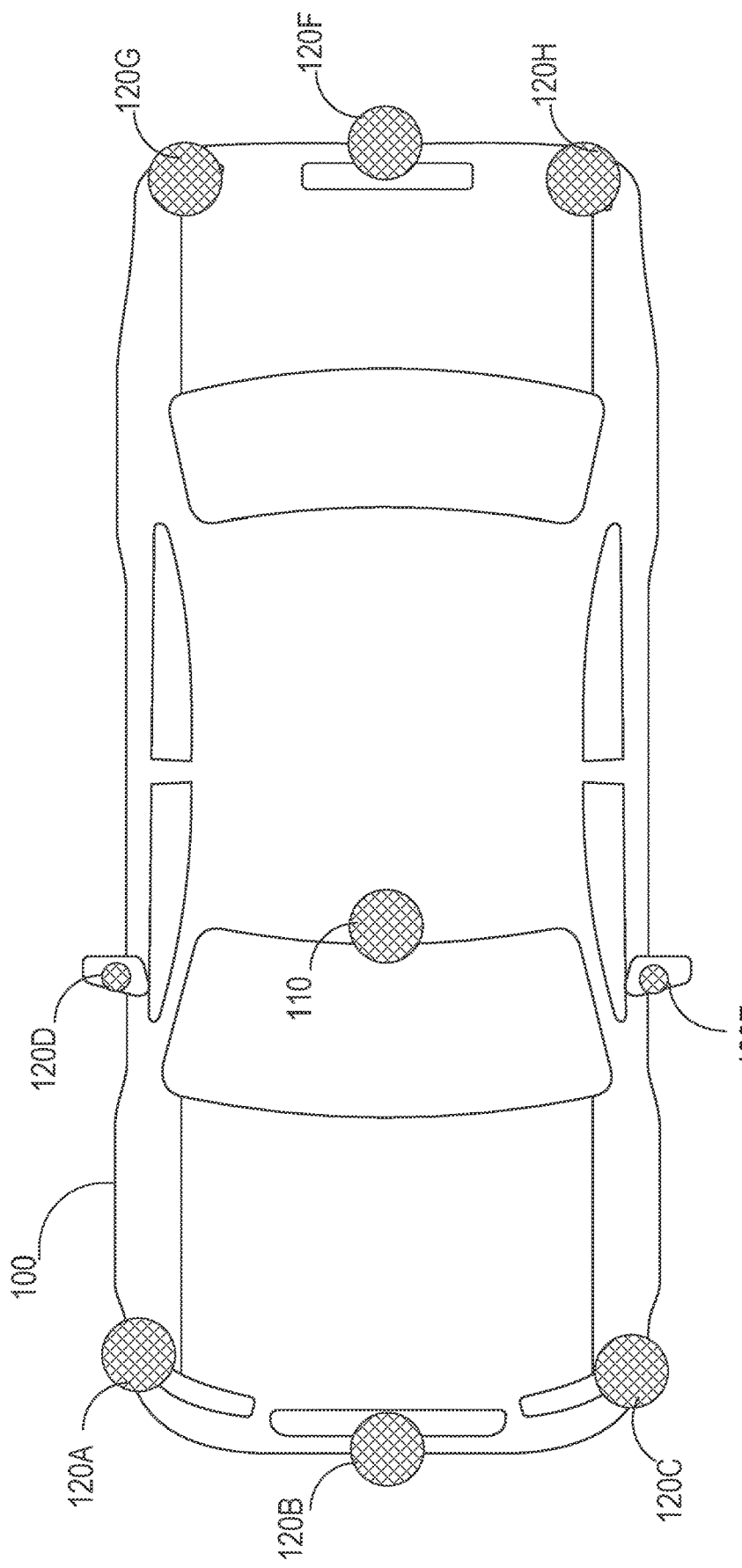
FIG. 1 illustrates one or more exemplary LiDAR systems disposed or included in a motor vehicle.

To provide a more thorough understanding of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

Although the following description uses terms "first," "second," etc. to describe various elements, these elements should not be limited by the terms. These terms are only used to distinguish one element from another. For example, a first sensor could be termed a second sensor and, similarly, a second sensor could be termed a first sensor, without departing from the scope of the various described examples. The first sensor and the second sensor can both be sensors and, in some cases, can be separate and different sensors.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the following disclosure, numerous references may be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, PLD, DSP, x86, ARM, RISC-V, Cold-Fire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

A LiDAR system is often used for three-dimensional perception of an environment. It is widely viewed as an essential sensor in the autonomous driving technologies and many other emerging technologies. Typically, a LiDAR system transmits a laser beam to a field-of-view (FOV) to illuminate an object. The object reflects or scatters the laser beam to form return light. Based on the return light, the LiDAR system calculates the distance between the object and the LiDAR system. For a scanning LiDAR system, the transmission laser beam is steered to scan the FOV for performing the three-dimensional perception of the surrounding environment. A steering mechanism of the LiDAR system enables the scanning of light beams by moving components of the LiDAR system. There are many types of steering mechanisms. For example, one steering mechanism rotates the transmitter and the receiver (collectively the transceiver) of the LiDAR system together. This type of steering mechanism may be used to obtain a 360 degree of horizontal FOV. However, rotation of the entire transceiver may cause reliability challenges because the electronic components of the transceiver (e.g., circuits, electronic connectors, wires, cables) are also rotated (sometimes at a high speed). The electronic components may degrade or have loose connections due to the rotation. To make a rotatable transceiver system more reliable, it is often associated with higher cost.

Another steering mechanism uses, for example, one or more rotatable optical components (e.g., a multiple-facets polygon mirror, a rotatable mirror, a rotatable prism) to reflect the transmission light beams. The rotatable optical components can have, for example, one or more facets that are configured to reflect light to other optical components in a LiDAR system (e.g., a mirror, a lens, or the like). In some embodiments, the dimension of the rotatable optical component (e.g., a multiple-facet polygon mirror) may need to be large enough for its proper operation. For example, a multiple-facet polygon mirror may need to have large-sized mirrors to reflect multiple beams. Further, because the rotatable optical component is required to rotate for scanning beams, it typically needs to have a large clearance spacing around it, so its rotation does not interfere with other components in the system. Thus, because of the large dimension and/or clearance spacing requirements associated with the rotatable optical components, steering mechanisms based on rotatable optical components may be difficult to fit into a small or compact space (e.g., a rearview mirror of a vehicle, a corner space of a vehicle, or other small spaces). Accordingly, there is a need for a reliable and compact steering mechanism for a LiDAR system.

Embodiments of present invention are described below. In various embodiments of the present disclosure, steering mechanisms of a compact LiDAR system are provided. A steering mechanism can include an optical refraction device and an optical reflection device. The present disclosure uses a flat mirror as an example of the optical reflection device to describe the various embodiments. It is understood that other types of optical reflection device may also be used (e.g., a multi-facet mirror, a concave mirror, a convex mirror, or the like). By controlling the optical refraction device and the mirror to oscillate, instead of rotating, the dimension of the steering mechanism can be reduced, thereby making the LiDAR system more compact. The reduced dimension of the steering mechanism makes the LiDAR system, or at least a portion of it, easier to fit into small spaces in a vehicle or another platform. These small spaces may include, for example, a rearview mirror, a vehicle corner, a camera assembly, etc. Moreover, the movement profiles of the optical refraction device and the mirror can be configured such that the two devices move in an alternating manner with respect to each other to obtain flat scanlines in both the horizontal and vertical scanning directions. Flat scanlines are oftentimes desired in the subsequent processing of the LiDAR scanlines (e.g., a perception process). Furthermore, position feedbacks are provided for controlling the optical refraction device and the mirror in real time. Therefore, their respective movement profiles can be adjusted or compensated to improve the position accuracy of both devices. As a result, the overall performance of the LiDAR system is improved.

FIG. 1 illustrates one or more exemplary LiDAR systems 110 disposed or included in a motor vehicle 100. Motor vehicle 100 can be a vehicle having any automated level. For example, motor vehicle 100 can be a partially automated vehicle, a highly automated vehicle, a fully automated vehicle, or a driverless vehicle. A partially automated vehicle can perform some driving functions without a human driver's intervention. For example, a partially automated vehicle can perform blind-spot monitoring, lane keeping and/or lane changing operations, automated emergency braking, smart cruising and/or traffic following, or the like. Certain operations of a partially automated vehicle may be limited to specific applications or driving scenarios (e.g., limited to only freeway driving). A highly automated vehicle can generally perform all operations of a partially automated vehicle but with less limitations. A highly automated vehicle can also detect its own limits in operating the vehicle and ask the driver to take over the control of the vehicle when necessary. A fully automated vehicle can perform all vehicle operations without a driver's intervention but can also detect its own limits and ask the driver to take over when necessary. A driverless vehicle can operate on its own without any driver intervention.

In typical configurations, motor vehicle 100 comprises one or more LiDAR systems 110 and 120A-F. Each of LiDAR systems 110 and 120A-F can be a scanning-based LiDAR system and/or a non-scanning LiDAR system (e.g., a flash LiDAR). A scanning-based LiDAR system scans one or more light beams in one or more directions (e.g., horizontal and vertical directions) to detect objects in a field-of-view (FOV). A non-scanning based LiDAR system transmits laser light to illuminate an FOV without scanning. For example, a flash LiDAR is a type of non-scanning based LiDAR system. A flash LiDAR can transmit laser light to simultaneously illuminate an FOV using a single light pulse or light shot.

A LiDAR system is often an essential sensor of a vehicle that is at least partially automated. In one embodiment, as shown in FIG. 1, motor vehicle 100 may include a single LiDAR system 110 (e.g., without LiDAR systems 120A-F) disposed at the highest position of the vehicle (e.g., at the vehicle roof). Disposing LiDAR system 110 at the vehicle roof facilitates a 360-degree scanning around vehicle 100. In some other embodiments, motor vehicle 100 can include multiple LiDAR systems, including two or more of systems 110 and/or 120A-F. As shown in FIG. 1, in one embodiment, multiple LiDAR systems 110 and/or 120A-F are attached to vehicle 100 at different locations of the vehicle. For example, LiDAR system 120A is attached to vehicle 100 at the front right corner; LiDAR system 120B is attached to vehicle 100 at the front center; LiDAR system 120C is attached to vehicle 100 at the front left corner; LiDAR system 120D is attached to vehicle 100 at the right-side rear view mirror; LiDAR system 120E is attached to vehicle 100 at the left-side rear view mirror; and/or LiDAR system 120F is attached to vehicle 100 at the back center. In some embodiments, LiDAR systems 110 and 120A-F are independent LiDAR systems having their own respective laser sources, control electronics, transmitters, receivers, and/or steering mechanisms. In other embodiments, some of LiDAR systems 110 and 120A-F can share one or more components, thereby forming a distributed sensor system. In one example, optical fibers are used to deliver laser light from a centralized laser source to all LiDAR systems. It is understood that one or more LiDAR systems can be distributed and attached to a vehicle in any desired manner and FIG. 1 only illustrates one embodiment. As another example, LiDAR systems 120D and 120E may be attached to the B-pillars of vehicle 100 instead of the rear-view mirrors. As another example, LiDAR system 120B may be attached to the windshield of vehicle 100 instead of the front bumper.

Figure 2:
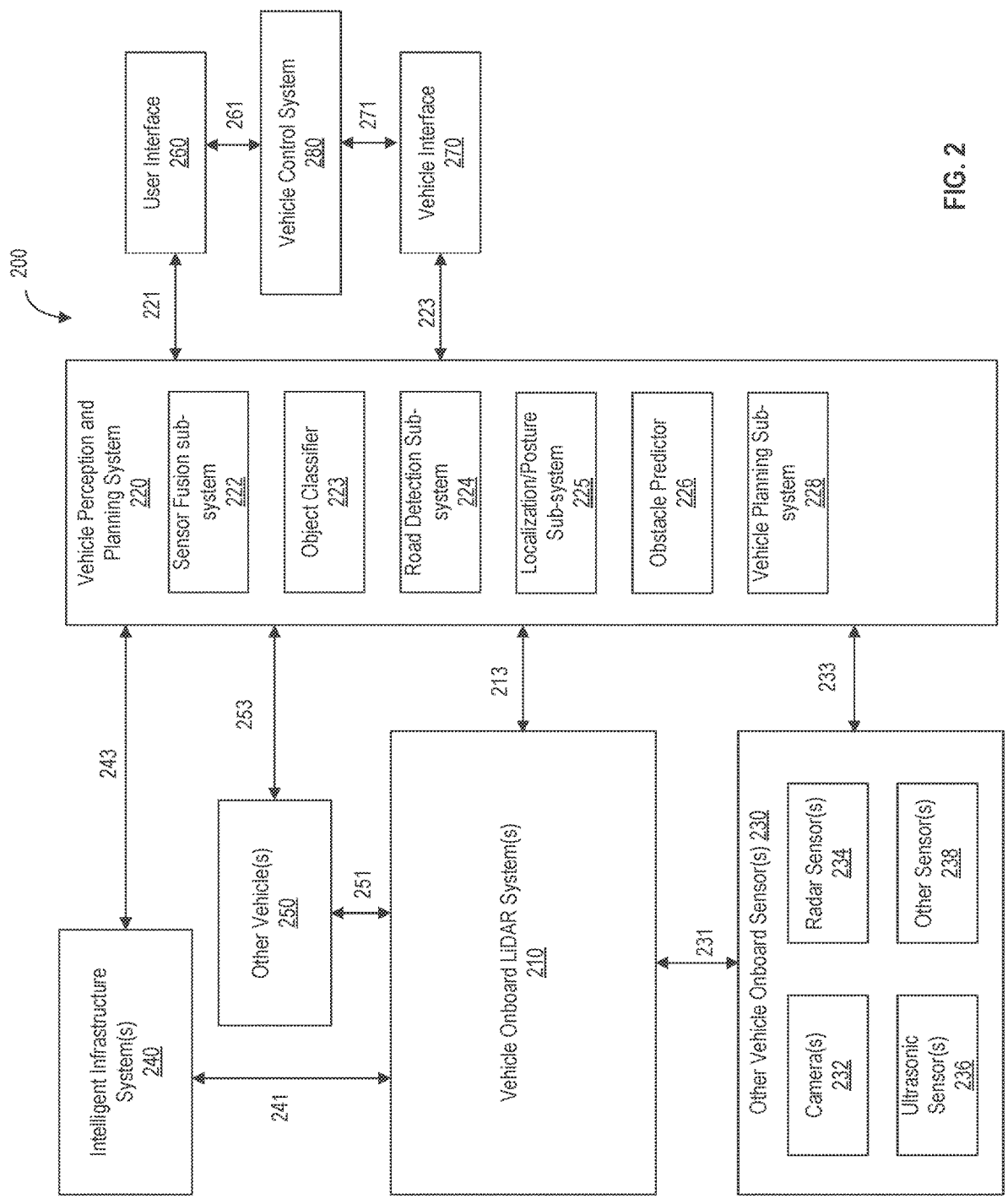
FIG. 2 is a block diagram illustrating interactions between an exemplary LiDAR system and multiple other systems including a vehicle perception and planning system.

FIG. 2 is a block diagram 200 illustrating interactions between vehicle onboard LiDAR system(s) 210 and multiple other systems including a vehicle perception and planning system 220. LiDAR system(s) 210 can be mounted on or integrated to a vehicle. LiDAR system(s) 210 include sensor(s) that scan laser light to the surrounding environment to measure the distance, angle, and/or velocity of objects. Based on the scattered light that returned to LiDAR system(s) 210, it can generate sensor data (e.g., image data or 3D point cloud data) representing the perceived external environment.

LiDAR system(s) 210 can include one or more of short-range LiDAR sensors, medium-range LiDAR sensors, and long-range LiDAR sensors. A short-range LiDAR sensor measures objects located up to about 20-40 meters from the LiDAR sensor. Short-range LiDAR sensors can be used for, e.g., monitoring nearby moving objects (e.g., pedestrians crossing street in a school zone), parking assistance applications, or the like. A medium-range LiDAR sensor measures objects located up to about 100-150 meters from the LiDAR sensor. Medium-range LiDAR sensors can be used for, e.g., monitoring road intersections, assistance for merging onto or leaving a freeway, or the like. A long-range LiDAR sensor measures objects located up to about 150-300 meters. Long-range LiDAR sensors are typically used when a vehicle is travelling at high speed (e.g., on a freeway), such that the vehicle's control systems may only have a few seconds (e.g., 6-8 seconds) to respond to any situations detected by the LiDAR sensor. As shown in FIG. 2, in one embodiment, the LiDAR sensor data can be provided to vehicle perception and planning system 220 via a communication path 213 for further processing and controlling the vehicle operations. Communication path 213 can be any wired or wireless communication links that can transfer data.

With reference still to FIG. 2, in some embodiments, other vehicle onboard sensor(s) 230 are used to provide additional sensor data separately or together with LiDAR system(s) 210. Other vehicle onboard sensors 230 may include, for example, one or more camera(s) 232, one or more radar(s) 234, one or more ultrasonic sensor(s) 236, and/or other sensor(s) 238. Camera(s) 232 can take images and/or videos of the external environment of a vehicle. Camera(s) 232 can take, for example, high-definition (HD) videos having millions of pixels in each frame. A camera produces monochrome or color images and videos. Color information may be important in interpreting data for some situations (e.g., interpreting images of traffic lights). Color information may not be available from other sensors such as LiDAR or radar sensors. Camera(s) 232 can include one or more of narrow-focus cameras, wider-focus cameras, side-facing cameras, infrared cameras, fisheye cameras, or the like. The image and/or video data generated by camera(s) 232 can also be provided to vehicle perception and planning system 220 via communication path 233 for further processing and controlling the vehicle operations. Communication path 233 can be any wired or wireless communication links that can transfer data.

Other vehicle onboard sensors(s) 230 can also include radar sensor(s) 234. Radar sensor(s) 234 use radio waves to determine the range, angle, and velocity of objects. Radar sensor(s) 234 produce electromagnetic waves in the radio or microwave spectrum. The electromagnetic waves reflect off an object and some of the reflected waves return to the radar sensor, thereby providing information about the object's position and velocity. Radar sensor(s) 234 can include one or more of short-range radar(s), medium-range radar(s), and long-range radar(s). A short-range radar measures objects located at about 0.1-30 meters from the radar. A short-range radar is useful in detecting objects located nearby the vehicle, such as other vehicles, buildings, walls, pedestrians, bicyclists, etc. A short-range radar can be used to detect a blind spot, assist in lane changing, provide rear-end collision warning, assist in parking, provide emergency braking, or the like. A medium-range radar measures objects located at about 30-80 meters from the radar. A long-range radar measures objects located at about 80-200 meters. Medium- and/or long-range radars can be useful in, for example, traffic following, adaptive cruise control, and/or highway automatic braking. Sensor data generated by radar sensor(s) 234 can also be provided to vehicle perception and planning system 220 via communication path 233 for further processing and controlling the vehicle operations.

Other vehicle onboard sensor(s) 230 can also include ultrasonic sensor(s) 236. Ultrasonic sensor(s) 236 use acoustic waves or pulses to measure object located external to a vehicle. The acoustic waves generated by ultrasonic sensor(s) 236 are transmitted to the surrounding environment. At least some of the transmitted waves are reflected off an object and return to the ultrasonic sensor(s) 236. Based on the return signals, a distance of the object can be calculated. Ultrasonic sensor(s) 236 can be useful in, for example, check blind spot, identify parking spots, provide lane changing assistance into traffic, or the like. Sensor data generated by ultrasonic sensor(s) 236 can also be provided to vehicle perception and planning system 220 via communication path 233 for further processing and controlling the vehicle operations.

In some embodiments, one or more other sensor(s) 238 may be attached in a vehicle and may also generate sensor data. Other sensor(s) 238 may include, for example, global positioning systems (GPS), inertial measurement units (IMU), or the like. Sensor data generated by other sensor(s) 238 can also be provided to vehicle perception and planning system 220 via communication path 233 for further processing and controlling the vehicle operations. It is understood that communication path 233 may include one or more communication links to transfer data between the various sensor(s) 230 and vehicle perception and planning system 220.

In some embodiments, as shown in FIG. 2, sensor data from other vehicle onboard sensor(s) 230 can be provided to vehicle onboard LiDAR system(s) 210 via communication path 231. LiDAR system(s) 210 may process the sensor data from other vehicle onboard sensor(s) 230. For example, sensor data from camera(s) 232, radar sensor(s) 234, ultrasonic sensor(s) 236, and/or other sensor(s) 238 may be correlated or fused with sensor data LiDAR system(s) 210, thereby at least partially offloading the sensor fusion process performed by vehicle perception and planning system 220. It is understood that other configurations may also be implemented for transmitting and processing sensor data from the various sensors (e.g., data can be transmitted to a cloud service for processing and then the processing results can be transmitted back to the vehicle perception and planning system 220).

With reference still to FIG. 2, in some embodiments, sensors onboard other vehicle(s) 250 are used to provide additional sensor data separately or together with LiDAR system(s) 210. For example, two or more nearby vehicles may have their own respective LiDAR sensor(s), camera(s), radar sensor(s), ultrasonic sensor(s), etc. Nearby vehicles can communicate and share sensor data with one another. Communications between vehicles are also referred to as V2V (vehicle to vehicle) communications. For example, as shown in FIG. 2, sensor data generated by other vehicle(s) 250 can be communicated to vehicle perception and planning system 220 and/or vehicle onboard LiDAR system(s) 210, via communication path 253 and/or communication path 251, respectively. Communication paths 253 and 251 can be any wired or wireless communication links that can transfer data.

Sharing sensor data facilitates a better perception of the environment external to the vehicles. For instance, a first vehicle may not sense a pedestrian that is a behind a second vehicle but is approaching the first vehicle. The second vehicle may share the sensor data related to this pedestrian with the first vehicle such that the first vehicle can have additional reaction time to avoid collision with the pedestrian. In some embodiments, similar to data generated by sensor(s) 230, data generated by sensors onboard other vehicle(s) 250 may be correlated or fused with sensor data generated by LiDAR system(s) 210, thereby at least partially offloading the sensor fusion process performed by vehicle perception and planning system 220.

In some embodiments, intelligent infrastructure system(s) 240 are used to provide sensor data separately or together with LiDAR system(s) 210. Certain infrastructures may be configured to communicate with a vehicle to convey information and vice versa. Communications between a vehicle and infrastructures are generally referred to as V2I (vehicle to infrastructure) communications. For example, intelligent infrastructure system(s) 240 may include an intelligent traffic light that can convey its status to an approaching vehicle in a message such as "changing to yellow in 5 seconds." Intelligent infrastructure system(s) 240 may also include its own LiDAR system mounted near an intersection such that it can convey traffic monitoring information to a vehicle. For example, a left-turning vehicle at an intersection may not have sufficient sensing capabilities because some of its own sensors may be blocked by traffics in the opposite direction. In such a situation, sensors of intelligent infrastructure system(s) 240 can provide useful, and sometimes vital, data to the left-turning vehicle. Such data may include, for example, traffic conditions, information of objects in the direction the vehicle is turning to, traffic light status and predictions, or the like. These sensor data generated by intelligent infrastructure system(s) 240 can be provided to vehicle perception and planning system 220 and/or vehicle onboard LiDAR system(s) 210, via communication paths 243 and/or 241, respectively. Communication paths 243 and/or 241 can include any wired or wireless communication links that can transfer data. For example, sensor data from intelligent infrastructure system(s) 240 may be transmitted to LiDAR system(s) 210 and correlated or fused with sensor data generated by LiDAR system(s) 210, thereby at least partially offloading the sensor fusion process performed by vehicle perception and planning system 220. V2V and V2I communications described above are examples of vehicle-to-X (V2X) communications, where the "X" represents any other devices, systems, sensors, infrastructure, or the like that can share data with a vehicle.

With reference still to FIG. 2, via various communication paths, vehicle perception and planning system 220 receives sensor data from one or more of LiDAR system(s) 210, other vehicle onboard sensor(s) 230, other vehicle(s) 250, and/or intelligent infrastructure system(s) 240. In some embodiments, different types of sensor data are correlated and/or integrated by a sensor fusion sub-system 222. For example, sensor fusion sub-system 222 can generate a 360-degree model using multiple images or videos captured by multiple cameras disposed at different positions of the vehicle. Sensor fusion sub-system 222 obtains sensor data from different types of sensors and uses the combined data to perceive the environment more accurately. For example, a vehicle onboard camera 232 may not capture a clear image because it is facing the sun or a light source (e.g., another vehicle's headlight during nighttime) directly. A LiDAR system 210 may not be affected as much and therefore sensor fusion sub-system 222 can combine sensor data provided by both camera 232 and LiDAR system 210, and use the sensor data provided by LiDAR system 210 to compensate the unclear image captured by camera 232. As another example, in a rainy or foggy weather, a radar sensor 234 may work better than a camera 232 or a LiDAR system 210. Accordingly, sensor fusion sub-system 222 may use sensor data provided by the radar sensor 234 to compensate the sensor data provided by camera 232 or LiDAR system 210.

In other examples, sensor data generated by other vehicle onboard sensor(s) 230 may have a lower resolution (e.g., radar sensor data) and thus may need to be correlated and confirmed by LiDAR system(s) 210, which usually has a higher resolution. For example, a sewage cover (also referred to as a manhole cover) may be detected by radar sensor 234 as an object towards which a vehicle is approaching. Due to the low-resolution nature of radar sensor 234, vehicle perception and planning system 220 may not be able to determine whether the object is an obstacle that the vehicle needs to avoid. High-resolution sensor data generated by LiDAR system(s) 210 thus can be used to correlated and confirm that the object is a sewage cover and causes no harm to the vehicle.

Vehicle perception and planning system 220 further comprises an object classifier 223. Using raw sensor data and/or correlated/fused data provided by sensor fusion sub-system 222, object classifier 223 can detect and classify the objects and estimate the positions of the objects. In some embodiments, object classifier 233 can use machine-learning based techniques to detect and classify objects. Examples of the machine-learning based techniques include utilizing algorithms such as region-based convolutional neural networks (R-CNN), Fast R-CNN, Faster R-CNN, histogram of oriented gradients (HOG), region-based fully convolutional network (R-FCN), single shot detector (SSD), spatial pyramid pooling (SPP-net), and/or You Only Look Once (Yolo).

Vehicle perception and planning system 220 further comprises a road detection sub-system 224. Road detection sub-system 224 localizes the road and identifies objects and/or markings on the road. For example, based on raw or fused sensor data provided by radar sensor(s) 234, camera(s) 232, and/or LiDAR system(s) 210, road detection sub-system 224 can build a 3D model of the road based on machine-learning techniques (e.g., pattern recognition algorithms for identifying lanes). Using the 3D model of the road, road detection sub-system 224 can identify objects (e.g., obstacles or debris on the road) and/or markings on the road (e.g., lane lines, turning marks, crosswalk marks, or the like).

Vehicle perception and planning system 220 further comprises a localization and vehicle posture sub-system 225. Based on raw or fused sensor data, localization and vehicle posture sub-system 225 can determine position of the vehicle and the vehicle's posture. For example, using sensor data from LiDAR system(s) 210, camera(s) 232, and/or GPS data, localization and vehicle posture sub-system 225 can determine an accurate position of the vehicle on the road and the vehicle's six degrees of freedom (e.g., whether the vehicle is moving forward or backward, up or down, and left or right). In some embodiments, high-definition (HD) maps are used for vehicle localization. HD maps can provide highly detailed, three-dimensional, computerized maps that pinpoint a vehicle's location. For instance, using the HD maps, localization and vehicle posture sub-system 225 can determine precisely the vehicle's current position (e.g., which lane of the road the vehicle is currently in, how close it is to a curb or a sidewalk) and predict vehicle's future positions.

Vehicle perception and planning system 220 further comprises obstacle predictor 226. Objects identified by object classifier 223 can be stationary (e.g., a light pole, a road sign) or dynamic (e.g., a moving pedestrian, bicycle, another car). For moving objects, predicting their moving path or future positions can be important to avoid collision. Obstacle predictor 226 can predict an obstacle trajectory and/or warn the driver or the vehicle planning sub-system 228 about a potential collision. For example, if there is a high likelihood that the obstacle's trajectory intersects with the vehicle's current moving path, obstacle predictor 226 can generate such a warning. Obstacle predictor 226 can use a variety of techniques for making such a prediction. Such techniques include, for example, constant velocity or acceleration models, constant turn rate and velocity/acceleration models, Kalman Filter and Extended Kalman Filter based models, recurrent neural network (RNN) based models, long short-term memory (LSTM) neural network based models, encoder-decoder RNN models, or the like.

With reference still to FIG. 2, in some embodiments, vehicle perception and planning system 220 further comprises vehicle planning sub-system 228. Vehicle planning sub-system 228 can include a route planner, a driving behaviors planner, and a motion planner. The route planner can plan the route of a vehicle based on the vehicle's current location data, target location data, traffic information, etc. The driving behavior planner adjusts the timing and planned movement based on how other objects might move, using the obstacle prediction results provided by obstacle predictor 226. The motion planner determines the specific operations the vehicle needs to follow. The planning results are then communicated to vehicle control system 280 via vehicle interface 270. The communication can be performed through communication paths 223 and 271, which include any wired or wireless communication links that can transfer data.

Vehicle control system 280 controls the vehicle's steering mechanism, throttle, brake, etc., to operate the vehicle according to the planned route and movement. Vehicle perception and planning system 220 may further comprise a user interface 260, which provides a user (e.g., a driver) access to vehicle control system 280 to, for example, override or take over control of the vehicle when necessary. User interface 260 can communicate with vehicle perception and planning system 220, for example, to obtain and display raw or fused sensor data, identified objects, vehicle's location/posture, etc. These displayed data can help a user to better operate the vehicle. User interface 260 can communicate with vehicle perception and planning system 220 and/or vehicle control system 280 via communication paths 221 and 261 respectively, which include any wired or wireless communication links that can transfer data. It is understood that the various systems, sensors, communication links, and interfaces in FIG. 2 can be configured in any desired manner and not limited to the configuration shown in FIG. 2.

Figure 3:
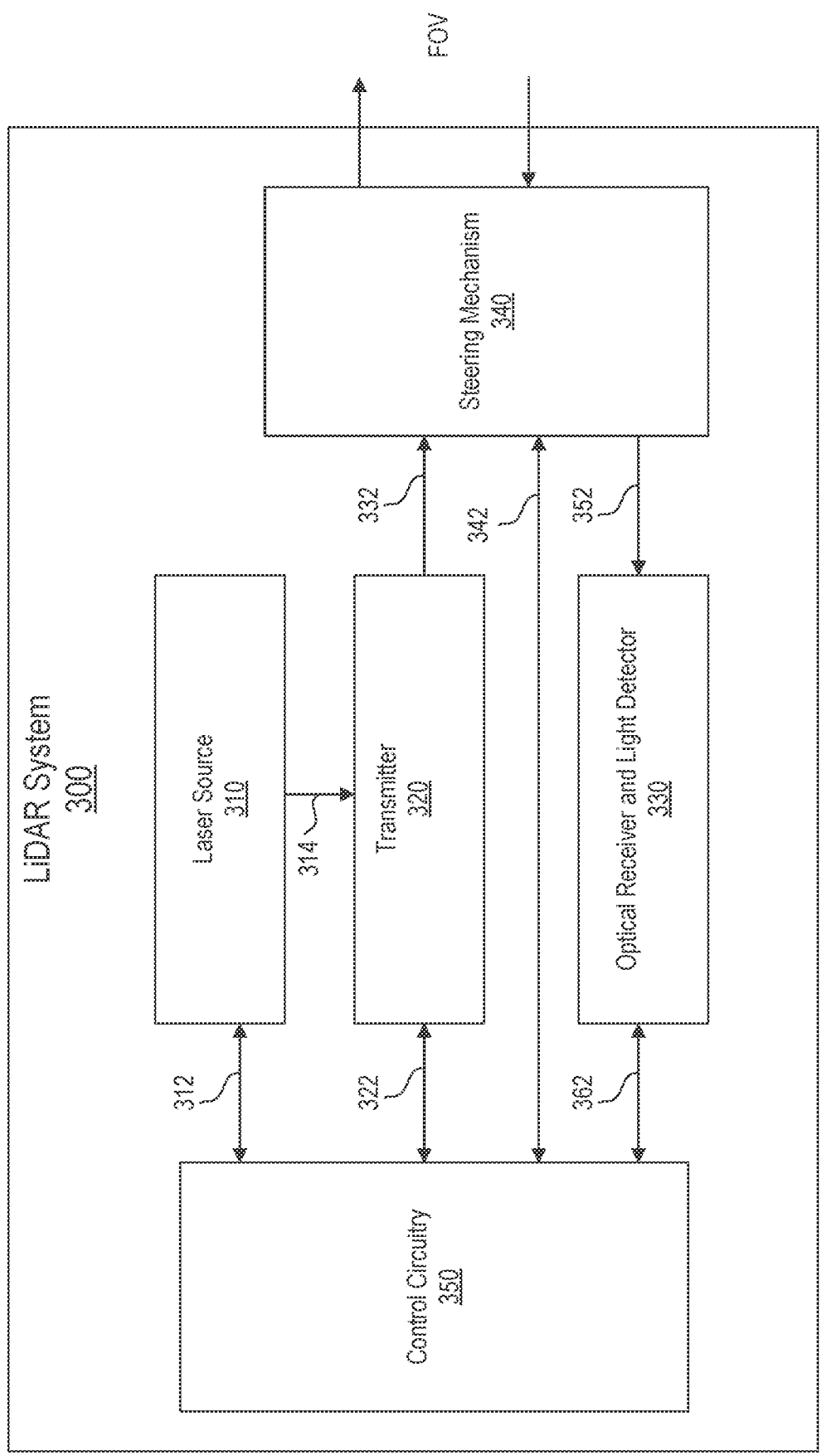
FIG. 3 is a block diagram illustrating an exemplary LiDAR system.

FIG. 3 is a block diagram illustrating an exemplary LiDAR system 300. LiDAR system 300 can be used to implement LiDAR system 110, 120A-F, and/or 210 shown in FIGS. 1 and 2. In one embodiment, LiDAR system 300 comprises a laser source 310, a transmitter 320, an optical receiver and light detector 330, a steering system 340, and a control circuitry 350. These components are coupled together using communications paths 312, 314, 322, 332, 343, 352, and 362. These communications paths include communication links (wired or wireless, bidirectional or unidirectional) among the various LiDAR system components, but need not be physical components themselves. While the communications paths can be implemented by one or more electrical wires, buses, or optical fibers, the communication paths can also be wireless channels or free-space optical paths so that no physical communication medium is present. For example, in one embodiment of LiDAR system 300, communication path 314 between laser source 310 and transmitter 320 may be implemented using one or more optical fibers. Communication paths 332 and 352 may represent optical paths implemented using free space optical components and/or optical fibers. And communication paths 312, 322, 342, and 362 may be implemented using one or more electrical wires that carry electrical signals. The communications paths can also include one or more of the above types of communication mediums (e.g., they can include an optical fiber and a free-space optical component, or include one or more optical fibers and one or more electrical wires).

LiDAR system 300 can also include other components not depicted in FIG. 3, such as power buses, power supplies, LED indicators, switches, etc. Additionally, other communication connections among components may be present, such as a direct connection between light source 310 and optical receiver and light detector 330 to provide a reference signal so that the time from when a light pulse is transmitted until a return light pulse is detected can be accurately measured.

Laser source 310 outputs laser light for illuminating objects in a field of view (FOV). Laser source 310 can be, for example, a semiconductor-based laser (e.g., a diode laser) and/or a fiber-based laser. A semiconductor-based laser can be, for example, an edge emitting laser (EEL), a vertical cavity surface emitting laser (VCSEL), or the like. A fiber-based laser is a laser in which the active gain medium is an optical fiber doped with rare-earth elements such as erbium, ytterbium, neodymium, dysprosium, praseodymium, thulium and/or holmium. In some embodiments, a fiber laser is based on double-clad fibers, in which the gain medium forms the core of the fiber surrounded by two layers of cladding. The double-clad fiber allows the core to be pumped with a high-power beam, thereby enabling the laser source to be a high power fiber laser source.

In some embodiments, laser source 310 comprises a master oscillator (also referred to as a seed laser) and power amplifier (MOPA). The power amplifier amplifies the output power of the seed laser. The power amplifier can be a fiber amplifier, a bulk amplifier, or a semiconductor optical amplifier. The seed laser can be a solid-state bulk laser or a tunable external-cavity diode laser. In some embodiments, laser source 310 can be an optically pumped microchip laser. Microchip lasers are alignment-free monolithic solid-state lasers where the laser crystal is directly contacted with the end mirrors of the laser resonator. A microchip laser is typically pumped with a laser diode (directly or using a fiber) to obtain the desired output power. A microchip laser can be based on neodymium-doped yttrium aluminum garnet ($Y_3Al_5O_{12}$) laser crystals (i.e., Nd:YAG), or neodymium-doped vanadate (i.e., $ND:YVO_4$) laser crystals.

Figure 4:
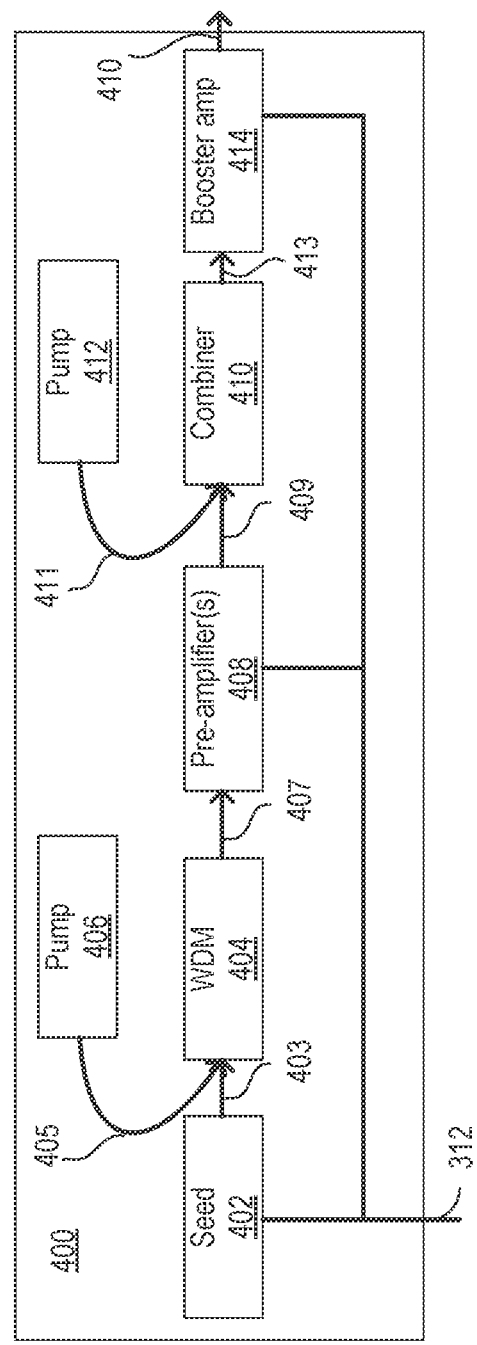
FIG. 4 is a block diagram illustrating an exemplary fiber-based laser source.

FIG. 4 is a block diagram illustrating an exemplary fiber-based laser source 400 having a seed laser and one or more pumps (e.g., laser diodes) for pumping desired output power. Fiber-based laser source 400 is an example of laser source 310 depicted in FIG. 3. In some embodiments, fiber-based laser source 400 comprises a seed laser 402 to generate initial light pulses of one or more wavelengths (e.g., 1550 nm), which are provided to a wavelength-division multiplexor (WDM) 404 via an optical fiber 403. Fiber-based laser source 400 further comprises a pump 406 for providing laser power (e.g., of a different wavelength, such as 980 nm) to WDM 404 via an optical fiber 405. WDM 404 multiplexes the light pulses provided by seed laser 402 and the laser power provided by pump 406 onto a single optical fiber 407. The output of WDM 404 can then be provided to one or more pre-amplifier(s) 408 via optical fiber 407. Pre-amplifier(s) 408 can be optical amplifier(s) that amplify optical signals (e.g., with about 20-30 dB gain). In some embodiments, pre-amplifier(s) 408 are low noise amplifiers. Pre-amplifier(s) 408 output to a combiner 410 via an optical fiber 409. Combiner 410 combines the output laser light of pre-amplifier(s) 408 with the laser power provided by pump 412 via an optical fiber 411. Combiner 410 can combine optical signals having the same wavelength or different wavelengths. One example of a combiner is a WDM. Combiner 410 provides pulses to a booster amplifier 414, which produces output light pulses via optical fiber 410. The booster amplifier 414 provides further amplification of the optical signals. The outputted light pulses can then be transmitted to transmitter 320 and/or steering mechanism 340 (shown in FIG. 3). It is understood that FIG. 4 illustrates one exemplary configuration of fiber-based laser source 400. Laser source 400 can have many other configurations using different combinations of one or more components shown in FIG. 4 and/or other components not shown in FIG. 4 (e.g., other components such as power supplies, lens, filters, splitters, combiners, etc.).

In some variations, fiber-based laser source 400 can be controlled (e.g., by control circuitry 350) to produce pulses of different amplitudes based on the fiber gain profile of the fiber used in fiber-based laser source 400. Communication path 312 couples fiber-based laser source 400 to control circuitry 350 (shown in FIG. 3) so that components of fiber-based laser source 400 can be controlled by or otherwise communicate with control circuitry 350. Alternatively, fiber-based laser source 400 may include its own dedicated controller. Instead of control circuitry 350 communicating directly with components of fiber-based laser source 400, a dedicated controller of fiber-based laser source 400 communicates with control circuitry 350 and controls and/or communicates with the components of fiber-based light source 400. Fiber-based light source 400 can also include other components not shown, such as one or more power connectors, power supplies, and/or power lines.

Referencing FIG. 3, typical operating wavelengths of laser source 310 comprise, for example, about 850 nm, about 905 nm, about 940 nm, about 1064 nm, and about 1550 nm. The upper limit of maximum usable laser power is set by the U.S. FDA (U.S. Food and Drug Administration) regulations. The optical power limit at 1550 nm wavelength is much higher than those of the other aforementioned wavelengths. Further, at 1550 nm, the optical power loss in a fiber is low. There characteristics of the 1550 nm wavelength make it more beneficial for long-range LiDAR applications. The amount of optical power output from laser source 310 can be characterized by its peak power, average power, and the pulse energy. The peak power is the ratio of pulse energy to the width of the pulse (e.g., full width at half maximum or FWHM). Thus, a smaller pulse width can provide a larger peak power for a fixed amount of pulse energy. A pulse width can be in the range of nanosecond or picosecond. The average power is the product of the energy of the pulse and the pulse repetition rate (PRR). As described in more detail below, the PRR represents the frequency of the pulsed laser light. The PRR typically corresponds to the maximum range that a LiDAR system can measure. Laser source 310 can be configured to produce pulses at high PRR to meet the desired number of data points in a point cloud generated by the LiDAR system. Laser source 310 can also be configured to produce pulses at medium or low PRR to meet the desired maximum detection distance. Wall plug efficiency (WPE) is another factor to evaluate the total power consumption, which may be a key indicator in evaluating the laser efficiency. For example, as shown in FIG. 1, multiple LiDAR systems may be attached to a vehicle, which may be an electrical-powered vehicle or a vehicle otherwise having limited fuel or battery power supply. Therefore, high WPE and intelligent ways to use laser power are often among the important considerations when selecting and configuring laser source 310 and/or designing laser delivery systems for vehicle-mounted LiDAR applications.

It is understood that the above descriptions provide non-limiting examples of a laser source 310. Laser source 310 can be configured to include many other types of light sources (e.g., laser diodes, short-cavity fiber lasers, solid-state lasers, and/or tunable external cavity diode lasers) that are configured to generate one or more light signals at various wavelengths. In some examples, light source 310 comprises amplifiers (e.g., pre-amplifiers and/or booster amplifiers), which can be a doped optical fiber amplifier, a solid-state bulk amplifier, and/or a semiconductor optical amplifier. The amplifiers are configured to receive and amplify light signals with desired gains.

With reference back to FIG. 3, LiDAR system 300 further comprises a transmitter 320. Laser source 310 provides laser light (e.g., in the form of a laser beam) to transmitter 320. The laser light provided by laser source 310 can be amplified laser light with a predetermined or controlled wavelength, pulse repetition rate, and/or power level. Transmitter 320 receives the laser light from laser source 310 and transmits the laser light to steering mechanism 340 with low divergence. In some embodiments, transmitter 320 can include, for example, optical components (e.g., lens, fibers, mirrors, etc.) for transmitting laser beams to a field-of-view (FOV) directly or via steering mechanism 340. While FIG. 3 illustrates transmitter 320 and steering mechanism 340 as separate components, they may be combined or integrated as one system in some embodiments. Steering mechanism 340 is described in more detail below.

Laser beams provided by laser source 310 may diverge as they travel to transmitter 320. Therefore, transmitter 320 often comprises a collimating lens configured to collect the diverging laser beams and produce parallel optical beams with reduced or minimum divergence. The parallel optical beams can then be further directed through various optics such as mirrors and lens. A collimating lens may be, for example, a plano-convex lens. The collimating lens can be configured to have any desired properties such as the beam diameter, divergence, numerical aperture, focal length, or the like. A beam propagation ratio or beam quality factor (also referred to as the $M^2$ factor) is used for measurement of laser beam quality. In many LiDAR applications, it is important to control good laser beam quality in generated a transmitting laser beam. The $M^2$ factor represents a degree of variation of a beam from an ideal Gaussian beam. Thus, the $M^2$ factor reflects how well a collimated laser beam can be focused on a small spot, or how well a divergent laser beam can be collimated. The smaller the $M^2$ factor, the tighter the focus of the laser beam and the more intense a beam spot can be obtained. Therefore, laser source 310 and/or transmitter 320 can be configured to obtained desired $M^2$ factor according to, for example, a scan resolution requirement.

One or more of the light beams provided by transmitter 320 are scanned by steering mechanism 340 to a FOV. Steering mechanism 340 scans light beams in multiple dimensions (e.g., in both the horizontal and vertical dimension) to facilitate LiDAR system 300 to map the environment by generating a 3D point cloud. Steering mechanism 340 will be described in more detail below. The laser light scanned to an FOV may be scattered or reflected by an object in the FOV. At least a portion of the scattered or reflected light returns to LiDAR system 300. FIG. 3 further illustrates an optical receiver and light detector 330 configured to receive the return light. Optical receiver and light detector 330 comprises an optical receiver that is configured to collect the return light from the FOV. The optical receiver can include optics (e.g., lens, fibers, mirrors, etc.) for receiving, redirecting, focus, amplifying, and/or filtering return light from the FOV. For example, the optical receiver often includes a receiver lens or focusing lens (e.g., a plano-convex lens) to collect and/or focus the collected return light onto a light detector.

A light detector detects the return light focused by the optical receiver and generates current and/or voltage signals proportional to the incident intensity of the return light. Based on such current and/or voltage signals, the depth information of the object in the FOV can be derived. One exemplary method for deriving such depth information is based on the direct TOF (time of flight), which is described in more detail below. A light detector may be characterized by its detection sensitivity, quantum efficiency, detector bandwidth, linearity, signal to noise ratio (SNR), overload resistance, interference immunity, etc. Based on the applications, the light detector can be configured or customized to have any desired characteristics. For example, optical receiver and light detector 330 can be configured such that the light detector has a large dynamic range while having a good linearity. The light detector linearity indicates the detector's capability of maintaining linear relationship between input optical signal power and the detector's output. A detector having good linearity can maintain a linear relationship over a large dynamic input optical signal range.

To achieve desired detector characteristics, configurations or customizations can be made to the light detector's structure and/or the detector's material system. Various detector structure can be used for a light detector. For example, a light detector structure can be a PIN based structure, which has a undoped intrinsic semiconductor region (i.e., an "i" region) between a p-type semiconductor and an n-type semiconductor region. Other light detector structures comprise, for example, a APD (avalanche photodiode) based structure, a PMT (photomultiplier tube) based structure, a SiPM (Silicon photomultiplier) based structure, a SPAD (single-photon avalanche diode) base structure, and/or quantum wires. For material systems used in a light detector, Si, InGaAs, and/or Si/Ge based materials can be used. It is understood that many other detector structures and/or material systems can be used in optical receiver and light detector 330.

A light detector (e.g., an APD based detector) may have an internal gain such that the input signal is amplified when generating an output signal. However, noise may also be amplified due to the light detector's internal gain. Common types of noise include signal shot noise, dark current shot noise, thermal noise, and amplifier noise (TIA). In some embodiments, optical receiver and light detector 330 may include a pre-amplifier that is a low noise amplifier (LNA). In some embodiments, the pre-amplifier may also include a TIA-transimpedance amplifier, which converts a current signal to a voltage signal. For a linear detector system, input equivalent noise or noise equivalent power (NEP) measures how sensitive the light detector is to weak signals. Therefore, they can be used as indicators of the overall system performance. For example, the NEP of a light detector specifies the power of the weakest signal that can be detected and therefore it in turn specifies the maximum range of a LiDAR system. It is understood that various light detector optimization techniques can be used to meet the requirement of LiDAR system 300. Such optimization techniques may include selecting different detector structures, materials, and/or implement signal processing techniques (e.g., filtering, noise reduction, amplification, or the like). For example, in addition to or instead of using direct detection of return signals (e.g., by using TOF), coherent detection can also be used for a light detector. Coherent detection allows for detecting amplitude and phase information of the received light by interfering the received light with a local oscillator. Coherent detection can improve detection sensitivity and noise immunity.

FIG. 3 further illustrates that LiDAR system 300 comprises steering mechanism 340. As described above, steering mechanism 340 directs light beams from transmitter 320 to scan an FOV in multiple dimensions. A steering mechanism is referred to as a raster mechanism or a scanning mechanism. Scanning light beams in multiple directions (e.g., in both the horizontal and vertical directions) facilitates a LiDAR system to map the environment by generating an image or a 3D point cloud. A steering mechanism can be based on mechanical scanning and/or solid-state scanning. Mechanical scanning uses rotating mirrors to steer the laser beam or physically rotate the LiDAR transmitter and receiver (collectively referred to as transceiver) to scan the laser beam. Solid-state scanning directs the laser beam to various positions through the FOV without mechanically moving any macroscopic components such as the transceiver. Solid-state scanning mechanisms include MEMS mirror based steering, optical phased arrays based steering, and flash LiDAR based steering. In some embodiments, because solid-state scanning mechanisms do not physically move macroscopic components, the steering performed by a solid-state scanning mechanism may be referred to as effective steering. A LiDAR system using solid-state scanning may also be referred to as a non-mechanical scanning or simply non-scanning LiDAR system (a flash LiDAR system is an exemplary non-scanning LiDAR system).

Steering mechanism 340 can be used with the transceiver (e.g., transmitter 320 and optical receiver and light detector 330) to scan the FOV for generating an image or a 3D point cloud. As an example, to implement steering mechanism 340, a two-dimensional mechanical scanner can be used with a single-point or several single-point transceivers. A single-point transceiver transmits a single light beam or a small number of light beams (e.g., 2-8 beams) to the steering mechanism. A two-dimensional mechanical steering mechanism comprises, for example, polygon mirror(s), oscillating mirror(s), rotating prism(s), rotating tilt mirror surface(s), or a combination thereof. In some embodiments, steering mechanism 340 may include non-mechanical steering mechanism(s) such as solid-state steering mechanism(s). For example, steering mechanism 340 can be based on tuning wavelength of the laser light combined with refraction effect, and/or based on reconfigurable grating/phase array. In some embodiments, steering mechanism 340 can use a single scanning device to achieve two-dimensional scanning or two devices combined to realize two-dimensional scanning.

As another example, to implement steering mechanism 340, a one-dimensional mechanical scanner can be used with an array or a large number of single-point transceivers. Specifically, the transceiver array can be mounted on a rotating platform to achieve 360-degree horizontal field of view. Alternatively, a static transceiver array can be combined with the one-dimensional mechanical scanner. A one-dimensional mechanical scanner comprises polygon mirror(s), oscillating mirror(s), rotating prism(s), rotating tilt mirror surface(s) for obtaining a forward-looking horizontal field of view. Steering mechanisms using mechanical scanners can provide robustness and reliability in high volume production for automotive applications.

As another example, to implement steering mechanism 340, a two-dimensional transceiver can be used to generate a scan image or a 3D point cloud directly. In some embodiments, a stitching or micro shift method can be used to improve the resolution of the scan image or the field of view being scanned. For example, using a two-dimensional transceiver, signals generated at one direction (e.g., the horizontal direction) and signals generated at the other direction (e.g., the vertical direction) may be integrated, interleaved, and/or matched to generate a higher or full resolution image or 3D point cloud representing the scanned FOV.

Some implementations of steering mechanism 340 comprise one or more optical redirection elements (e.g., mirrors or lens) that steer return light signals (e.g., by rotating, vibrating, or directing) along a receive path to direct the return light signals to optical receiver and light detector 330. The optical redirection elements that direct light signals along the transmitting and receiving paths may be the same components (e.g., shared), separate components (e.g., dedicated), and/or a combination of shared and separate components. This means that in some cases the transmitting and receiving paths are different although they may partially overlap (or in some cases, substantially overlap or coaxially aligned).

With reference still to FIG. 3, LiDAR system 300 further comprises control circuitry 350. Control circuitry 350 can be configured and/or programmed to control various parts of the LiDAR system 300 and/or to perform signal processing. In a typical system, control circuitry 350 can be configured and/or programmed to perform one or more control operations including, for example, controlling laser source 310 to obtain desired laser pulse timing, repetition rate, and power; controlling steering mechanism 340 (e.g., controlling the speed, direction, and/or other parameters) to scan the FOV and maintain pixel registration/alignment; controlling optical receiver and light detector 330 (e.g., controlling the sensitivity, noise reduction, filtering, and/or other parameters) such that it is an optimal state; and monitoring overall system health/status for functional safety.

Control circuitry 350 can also be configured and/or programmed to perform signal processing to the raw data generated by optical receiver and light detector 330 to derive distance and reflectance information, and perform data packaging and communication to vehicle perception and planning system 220 (shown in FIG. 2). For example, control circuitry 350 determines the time it takes from transmitting a light pulse until a corresponding return light pulse is received; determines when a return light pulse is not received for a transmitted light pulse; determines the direction (e.g., horizontal and/or vertical information) for a transmitted/return light pulse; determines the estimated range in a particular direction; and/or determines any other type of data relevant to LiDAR system 300.

LiDAR system 300 can be disposed in a vehicle, which may operate in many different environments including hot or cold weather, rough road conditions that may cause intense vibration, high or low humidifies, dusty areas, etc. Therefore, in some embodiments, optical and/or electronic components of LiDAR system 300 (e.g., optics in transmitter 320, optical receiver and light detector 330, and steering mechanism 340) are disposed or configured in such a manner to maintain long term mechanical and optical stability. For example, components in LiDAR system 300 may be secured and sealed such that they can operate under all conditions a vehicle may encounter. As an example, an anti-moisture coating and/or hermetic sealing may be applied to optical components of transmitter 320, optical receiver and light detector 330, and steering mechanism 340 (and other components that are susceptible to moisture). As another example, housing(s), enclosure(s), and/or window can be used in LiDAR system 300 for providing desired characteristics such as hardness, ingress protection (IP) rating, self-cleaning capability, resistance to chemical and resistance to impact, or the like. In addition, efficient and economical methodologies for assembling LiDAR system 300 may be used to meet the LiDAR operating requirements while keeping the cost low.

It is understood by a person of ordinary skill in the art that FIG. 3 and the above descriptions are for illustrative purposes only, and a LiDAR system can include other functional units, blocks, or segments, and can include variations or combinations of these above functional units, blocks, or segments. For example, LiDAR system 300 can also include other components not depicted in FIG. 3, such as power buses, power supplies, LED indicators, switches, etc. Additionally, other connections among components may be present, such as a direct connection between light source 310 and optical receiver and light detector 330 so that light detector 330 can accurately measure the time from when light source 310 transmits a light pulse until light detector 330 detects a return light pulse.

These components shown in FIG. 3 are coupled together using communications paths 312, 314, 322, 332, 342, 352, and 362. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 314 includes one or more optical fibers; communication path 352 represents an optical path; and communication paths 312, 322, 342, and 362 are all electrical wires that carry electrical signals. The communication paths can also include more than one of the above types of communication mediums (e.g., they can include an optical fiber and an optical path, or one or more optical fibers and one or more electrical wires).

Figure 5A:
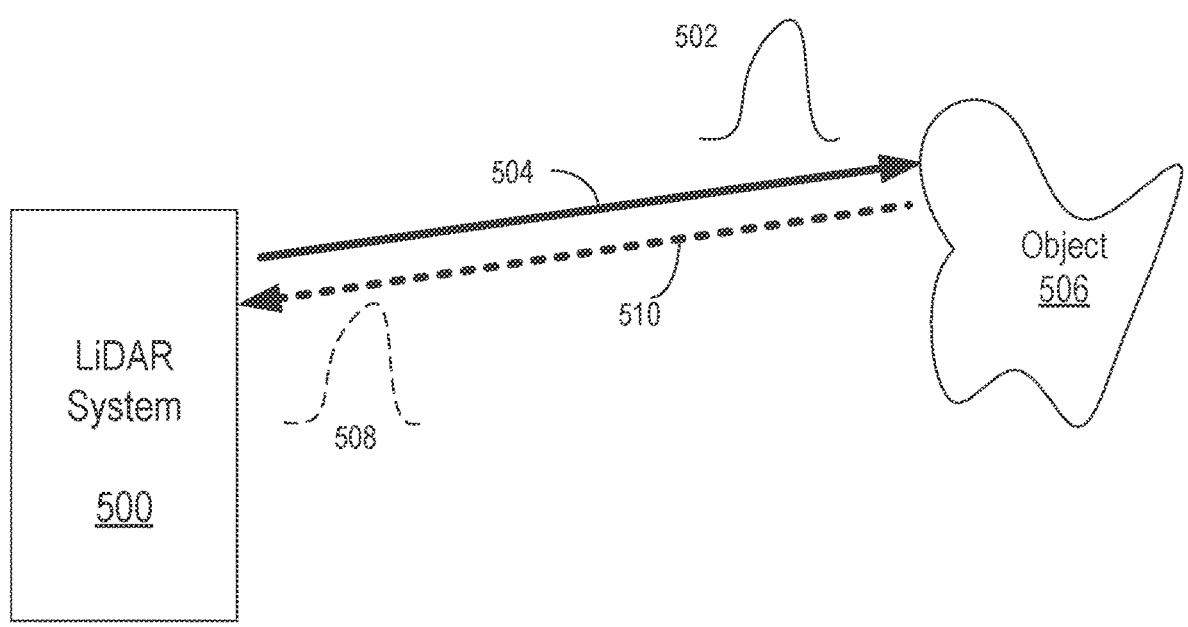
FIGS. 5A-5C illustrate an exemplary LiDAR system using pulse signals to measure distances to objects disposed in a field-of-view (FOV).

As described above, some LiDAR systems use the time-of-flight (TOF) of light signals (e.g., light pulses) to determine the distance to objects in a light path. For example, with reference to FIG. 5A, an exemplary LiDAR system 500 includes a laser light source (e.g., a fiber laser), a steering system (e.g., a system of one or more moving mirrors), and a light detector (e.g., a photon detector with one or more optics). LiDAR system 500 can be implemented using, for example, LiDAR system 300 described above. LiDAR system 500 transmits a light pulse 502 along light path 504 as determined by the steering system of LiDAR system 500. In the depicted example, light pulse 502, which is generated by the laser light source, is a short pulse of laser light. Further, the signal steering system of the LiDAR system 500 is a pulsed-signal steering system. However, it should be appreciated that LiDAR systems can operate by generating, transmitting, and detecting light signals that are not pulsed and derive ranges to an object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulsed signals also may be applicable to LiDAR systems that do not use one or both of these techniques.

Referring back to FIG. 5A (e.g., illustrating a time-of-flight LiDAR system that uses light pulses), when light pulse 502 reaches object 506, light pulse 502 scatters or reflects to generate a return light pulse 508. Return light pulse 508 may return to system 500 along light path 510. The time from when transmitted light pulse 502 leaves LiDAR system 500 to when return light pulse 508 arrives back at LiDAR system 500 can be measured (e.g., by a processor or other electronics, such as control circuitry 350, within the LiDAR system). This time-of-flight combined with the knowledge of the speed of light can be used to determine the range/distance from LiDAR system 500 to the portion of object 506 where light pulse 502 scattered or reflected.

Figure 5B:
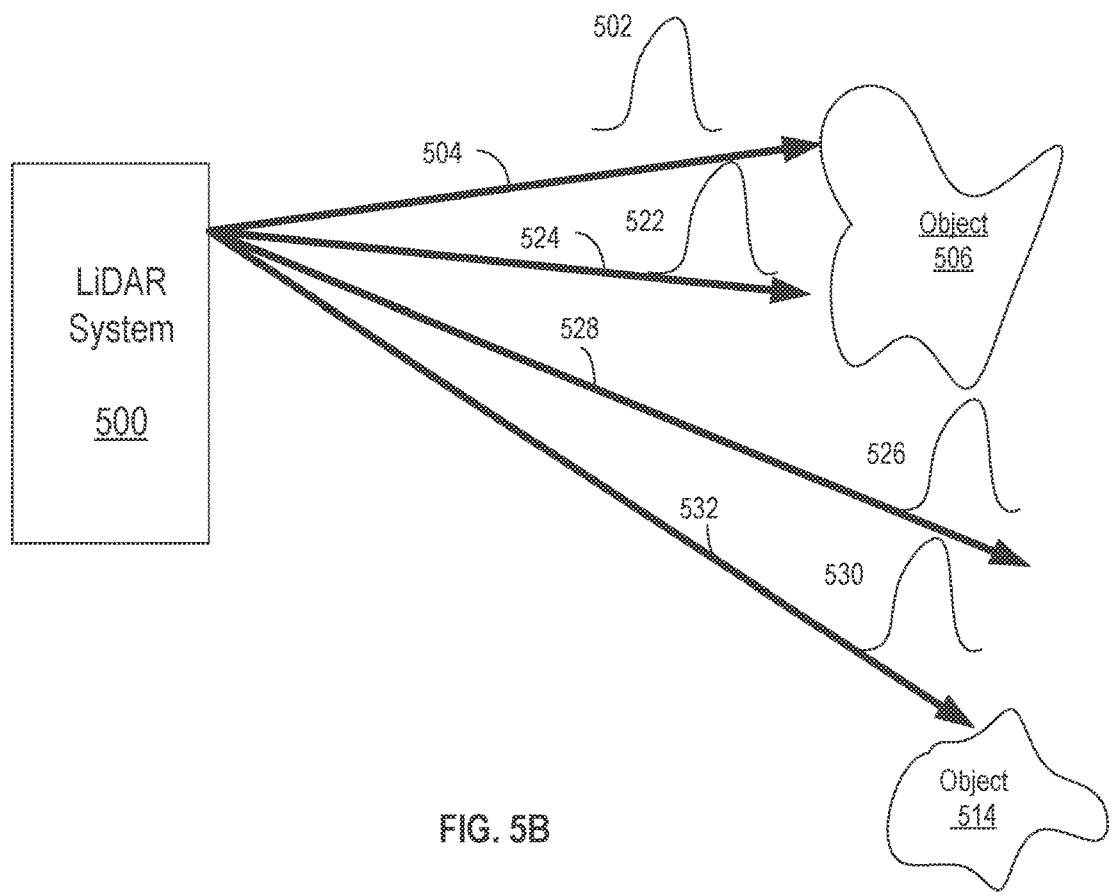
Figure 5C:
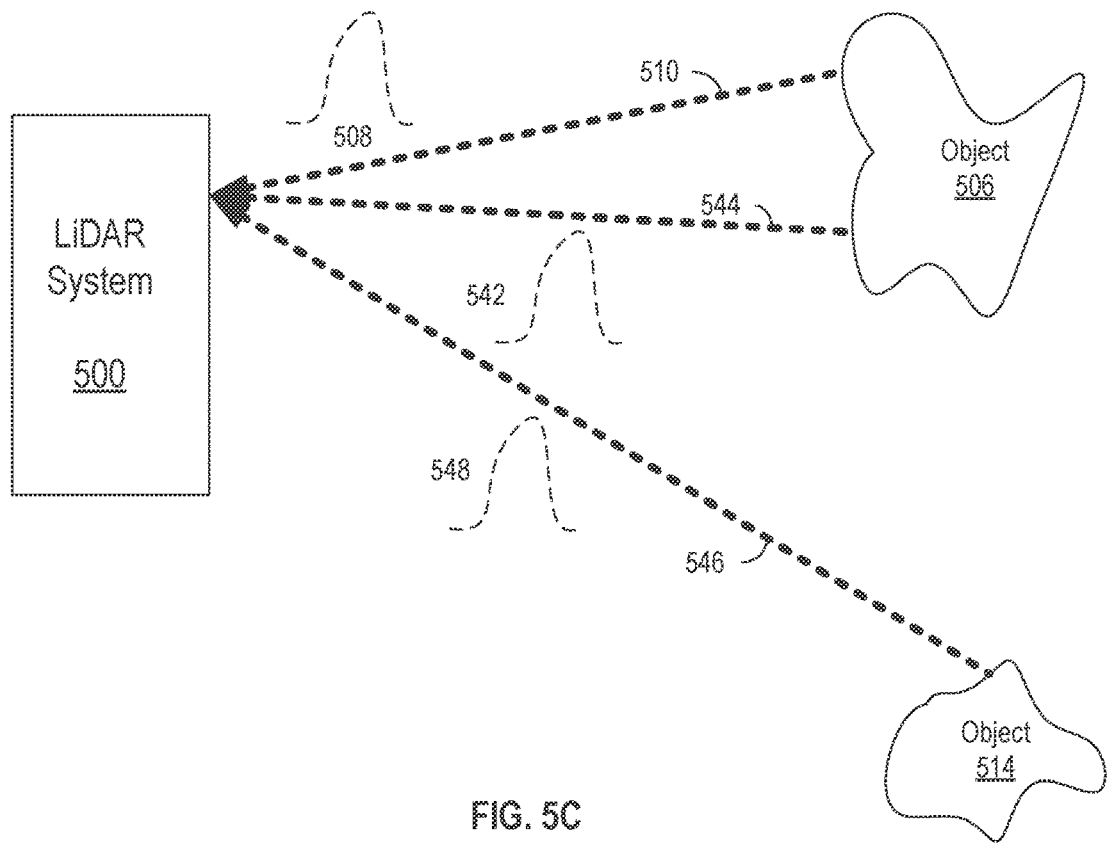

By directing many light pulses, as depicted in FIG. 5B, LiDAR system 500 scans the external environment (e.g., by directing light pulses 502, 522, 526, 530 along light paths 504, 524, 528, 532, respectively). As depicted in FIG. 5C, LiDAR system 500 receives return light pulses 508, 542, 548 (which correspond to transmitted light pulses 502, 522, 530, respectively). Return light pulses 508, 542, and 548 are generated by scattering or reflecting the transmitted light pulses by one of objects 506 and 514. Return light pulses 508, 542, and 548 may return to LiDAR system 500 along light paths 510, 544, and 546, respectively. Based on the direction of the transmitted light pulses (as determined by LiDAR system 500) as well as the calculated range from LiDAR system 500 to the portion of objects that scatter or reflect the light pulses (e.g., the portions of objects 506 and 514), the external environment within the detectable range (e.g., the field of view between path 504 and 532, inclusively) can be precisely mapped or plotted (e.g., by generating a 3D point cloud or images).

If a corresponding light pulse is not received for a particular transmitted light pulse, then it may be determined that there are no objects within a detectable range of LiDAR system 500 (e.g., an object is beyond the maximum scanning distance of LiDAR system 500). For example, in FIG. 5B, light pulse 526 may not have a corresponding return light pulse (as illustrated in FIG. 5C) because light pulse 526 may not produce a scattering event along its transmission path 528 within the predetermined detection range. LiDAR system 500, or an external system in communication with LiDAR system 500 (e.g., a cloud system or service), can interpret the lack of return light pulse as no object being disposed along light path 528 within the detectable range of LiDAR system 500.

In FIG. 5B, light pulses 502, 522, 526, and 530 can be transmitted in any order, serially, in parallel, or based on other timings with respect to each other. Additionally, while FIG. 5B depicts transmitted light pulses as being directed in one dimension or one plane (e.g., the plane of the paper), LiDAR system 500 can also direct transmitted light pulses along other dimension(s) or plane(s). For example, LiDAR system 500 can also direct transmitted light pulses in a dimension or plane that is perpendicular to the dimension or plane shown in FIG. 5B, thereby forming a 2-dimensional transmission of the light pulses. This 2-dimensional transmission of the light pulses can be point-by-point, line-by-line, all at once, or in some other manner. A point cloud or image from a 1-dimensional transmission of light pulses (e.g., a single horizontal line) can generate 2-dimensional data (e.g., (1) data from the horizontal transmission direction and (2) the range or distance to objects). Similarly, a point cloud or image from a 2-dimensional transmission of light pulses can generate 3-dimensional data (e.g., (1) data from the horizontal transmission direction, (2) data from the vertical transmission direction, and (3) the range or distance to objects). In general, a LiDAR system performing an n-dimensional transmission of light pulses generates (n+1) dimensional data. This is because the LiDAR system can measure the depth of an object or the range/distance to the object, which provides the extra dimension of data. Therefore, a 2D scanning by a LiDAR system can generate a 3D point cloud for mapping the external environment of the LiDAR system.

The density of a point cloud refers to the number of measurements (data points) per area performed by the LiDAR system. A point cloud density relates to the LiDAR scanning resolution. Typically, a larger point cloud density, and therefore a higher resolution, is desired at least for the region of interest (ROI). The density of points in a point cloud or image generated by a LiDAR system is equal to the number of pulses divided by the field of view. In some embodiments, the field of view can be fixed. Therefore, to increase the density of points generated by one set of transmission-receiving optics (or transceiver optics), the LiDAR system may need to generate a pulse more frequently. In other words, a light source with a higher pulse repetition rate (PRR) is needed. On the other hand, by generating and transmitting pulses more frequently, the farthest distance that the LiDAR system can detect may be limited. For example, if a return signal from a distant object is received after the system transmits the next pulse, the return signals may be detected in a different order than the order in which the corresponding signals are transmitted, thereby causing ambiguity if the system cannot correctly correlate the return signals with the transmitted signals.

To illustrate, consider an exemplary LiDAR system that can transmit laser pulses with a repetition rate between 500 kHz and 1 MHz. Based on the time it takes for a pulse to return to the LiDAR system and to avoid mix-up of return pulses from consecutive pulses in a conventional LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate return signals that arrive out of order, increasing the repetition rate from 500 kHz to 1 MHz (and thus improving the density of points of the system) may reduce the detection range of the system. Various techniques are used to mitigate the tradeoff between higher PRR and limited detection range. For example, multiple wavelengths can be used for detecting objects in different ranges. Optical and/or signal processing techniques are also used to correlate between transmitted and return light signals.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Figure 13:
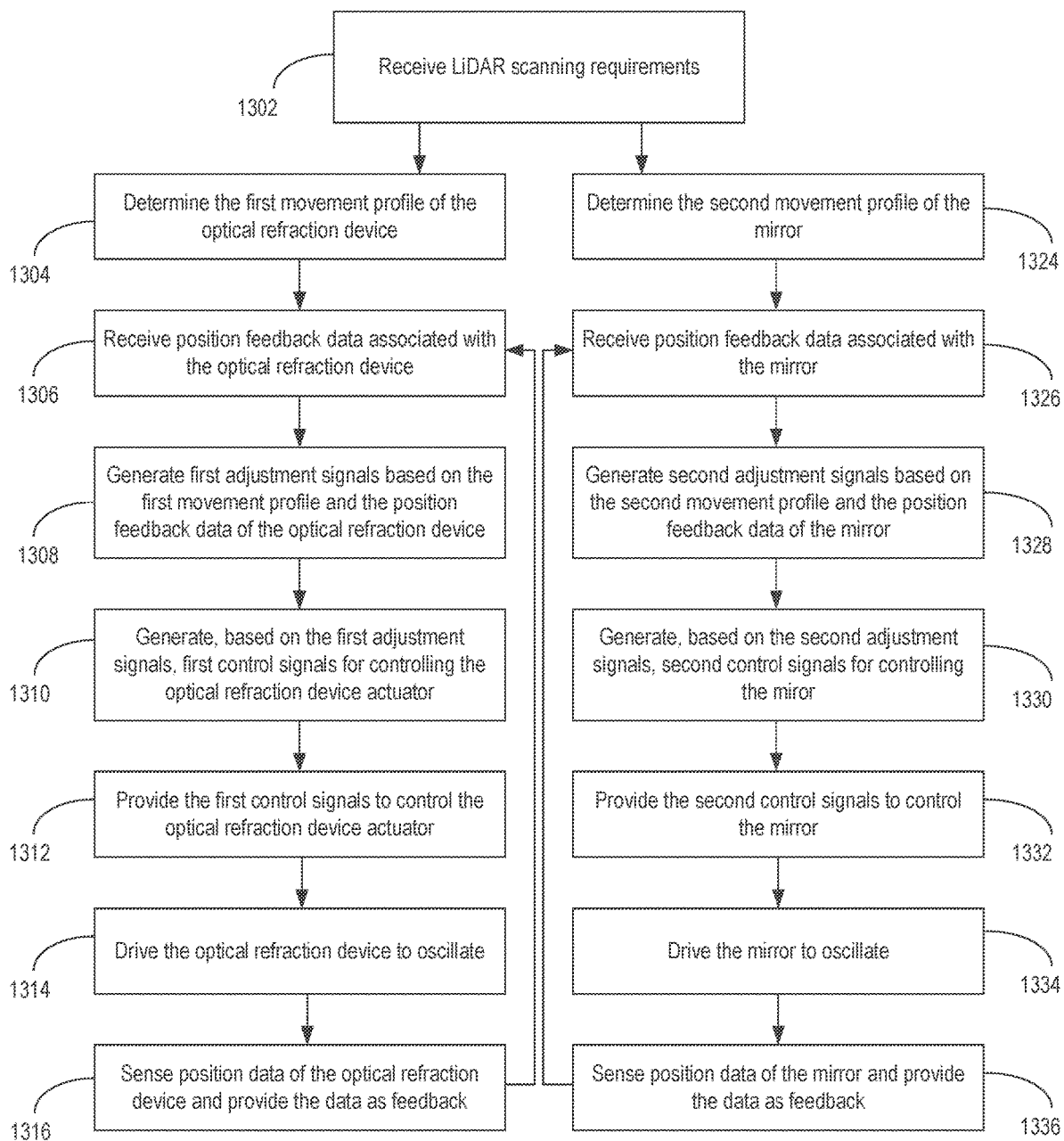
FIG. 13 is a flowchart of an example method of controlling the movements of an optical refraction device and a mirror, according to some embodiments.

Various systems, apparatus, and methods described herein may be implemented using a computer program product tangibly embodied in an information carrier, e.g., in a non-transitory machine-readable storage device, for execution by a programmable processor; and the method processes and steps described herein, including one or more of the steps of FIG. 13, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
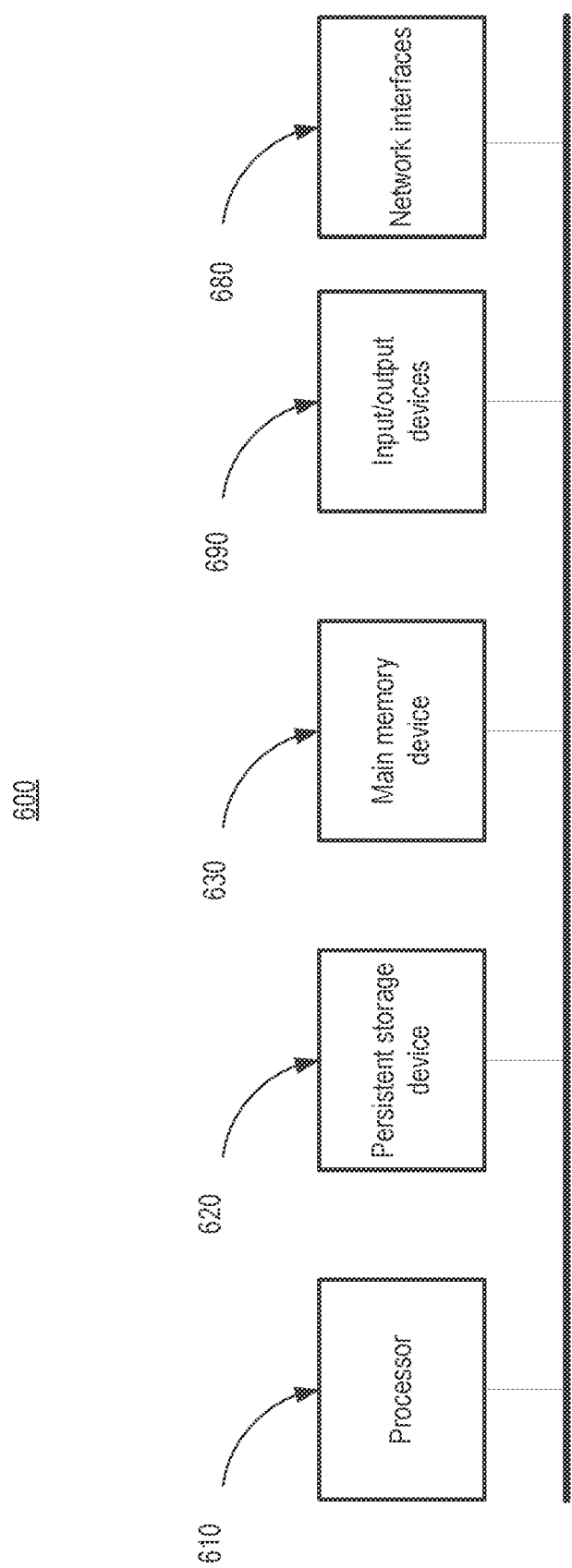
FIG. 6 is a block diagram illustrating an exemplary apparatus used to implement systems, apparatus, and methods in various embodiments.

A high-level block diagram of an exemplary apparatus that may be used to implement systems, apparatus and methods described herein is illustrated in FIG. 6. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, processor 610 may be used to implement one or more components and systems described herein, such as control circuitry 350 (shown in FIG. 3), vehicle perception and planning system 220 (shown in FIG. 2), and vehicle control system 280 (shown in FIG. 2). Thus, one or more of the method steps of FIG. 13 can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by one or more of the method steps of FIG. 13. Accordingly, by executing the computer program instructions, the processor 610 executes an algorithm defined by the methods of FIGS. 3-5 and 13. Apparatus 600 also includes one or more network interfaces 680 for communicating with other devices via a network. Apparatus 600 may also include one or more input/output devices 690 that enable user interaction with apparatus 600 (e.g., display, keyboard, mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing, e.g., for various image processing applications described herein. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 690 may include peripherals, such as a printer, scanner, display screen, etc. For example, input/output devices 690 may include a display device such as a cathode ray tube (CRT), plasma or liquid crystal display (LCD) monitor for displaying information to a user, a keyboard, and a pointing device such as a mouse or a trackball by which the user can provide input to apparatus 600.

Any or all of the functions of the systems and apparatuses discussed herein may be performed by processor 610, and/or incorporated in, an apparatus or a system such as LiDAR system 300. Further, LiDAR system 300 and/or apparatus 600 may utilize one or more neural networks or other deep-learning techniques performed by processor 610 or other systems or apparatuses discussed herein.

One skilled in the art will recognize that an implementation of an actual computer or computer system may have other structures and may contain other components as well, and that FIG. 6 is a high-level representation of some of the components of such a computer for illustrative purposes.

Figure 7:
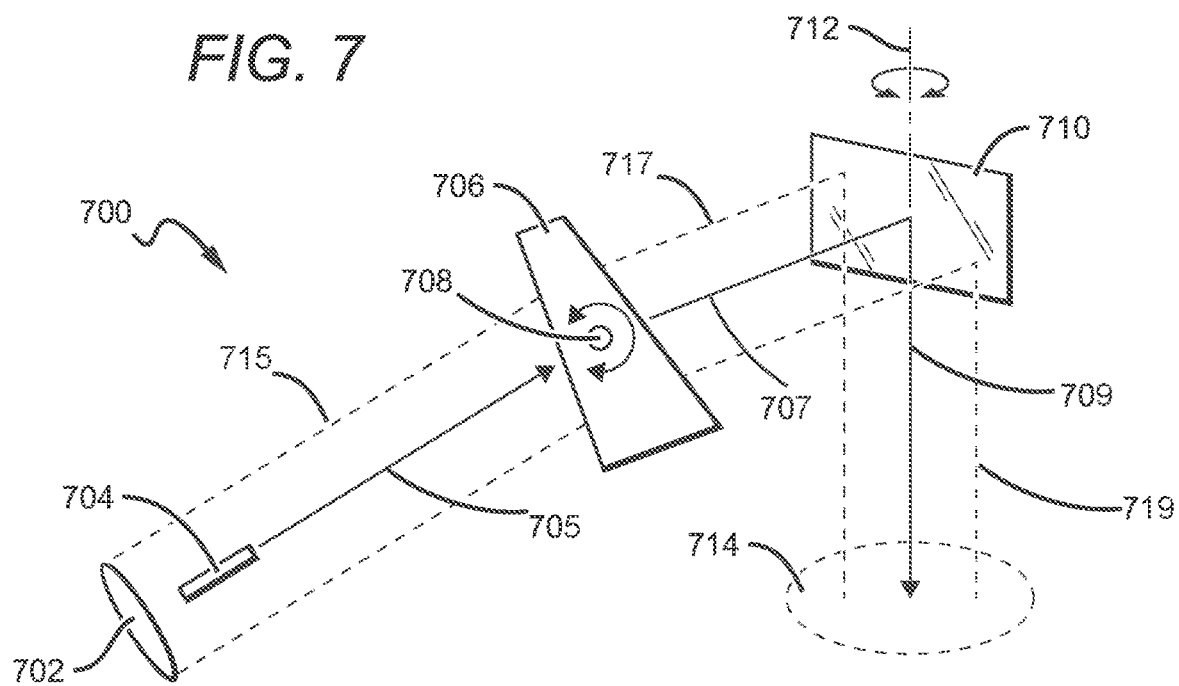
FIG. 7 is an illustration of a simplified compact LiDAR system that uses an optical refraction device according to some embodiments.

FIG. 7 is an illustration of a simplified compact LiDAR system 700 that uses an optical refraction device 706 and a mirror 710 according to some embodiments. As shown in FIG. 7, in some embodiments, system 700 includes a collection lens 702, a transmitter 704, an optical refraction device 706, and a mirror 710. Transmitter 704 transmits one or more transmission light beams 705 toward optical refraction device 706. In some embodiments, transmitter 704 is implemented using transmitter 320 and optionally one or more other components shown in FIG. 3 (e.g., laser source 310). Transmission light beams 705 are laser beams having a desired wavelength (e.g., 1550 nm). In the embodiment shown in FIG. 7, transmitter 705 is disposed between collection lens 702 and optical refraction device 706. It is understood that transmitter 705 can also be disposed at other places (e.g., disposed in front of collection lens 702, at the side of collection lens 702, or the like). In some embodiments, there may be other optical components (e.g., a collimation lens, a filter, or the like) disposed between transmitter 704 and optical refraction device 706.

In some embodiments, optical refraction device 706 refracts the transmission light beams 705. All or a substantial portion of one or more transmission light beams 705 travel through optical refraction device 706 and change direction because of the optical refraction effect. In one embodiment, optical refraction device 706 changes the direction of transmission light beams 705 such that the refracted transmission light beams 707 do not continue from transmission light beams 705 as a straight line. Refracted transmission light beams 707 are directed to a mirror 710. Mirror 710 reflects the refracted transmission light beams 707 to form transmission light beams 709 to illuminate objects in a field of view 714. Mirror 710 is an example of an optical reflection device that can be used in the steering mechanism shown in FIG. 7. Other optical reflection device (e.g., a dual-facet mirror, a concave mirror, a convex mirror, etc.) may also be used.

In some embodiments, optical refraction device 706 is coupled to a first actuator (not shown in FIG. 7). The first actuator is configured to oscillate optical refraction device 706 about an axis 708. In this disclosure, oscillation means continuously moving back and forth in two opposite directions (e.g., clockwise and counterclockwise) within a predetermined angular range (e.g., 40 degrees, 80 degrees, etc.) in a periodical manner. Rotation means continuously moving in only one direction for at least 360 degrees. When optical refraction device 706 oscillates, it changes the direction of refracted transmission light beams 707 along one dimension (e.g., the "y" or vertical dimension). As a result, transmission light beams 709 are steered to scan the corresponding dimension (e.g., the "y" or vertical dimension) of the FOV. Depending on how optical refraction device 706 is oriented, transmission light beams 709 can be steered to scan the horizontal dimension or the vertical dimension by device 706. Similarly, mirror 710 is coupled to a second actuator (not shown in FIG. 7) configured to oscillate mirror 710 about an axis 712. When mirror 710 oscillates, it changes the direction of transmission light beams 709 along another dimension (e.g., the "x" or horizontal dimension). As a result, transmission light beams 709 is further steered to scan another corresponding dimension (e.g., the "x" or horizontal dimension) of the FOV. Depending on how mirror 710 is oriented, transmission light beams 709 can be steered to scan the horizontal dimension or the vertical dimension by mirror 710. Accordingly, optical refraction device 706 and mirror 710, when oscillating, steer light beams both vertically and horizontally to illuminate one or more objects within an FOV.

If a transmission light beam 709 reaches an object within the FOV, it may be reflected and/or scattered to form return light 719. Return light 719 can include multiple return light pulses. Return light 719 travels to mirror 710, which redirects (e.g., reflects) return light 719 to form redirected return light 717. The redirected return light 717 travels toward optical refraction device 706. Optical refraction device 706 refracts redirected return light 717 to form refracted return light 715. Refracted return light 715 is directed toward collection lens 702. Collection lens 702 then directs (e.g., focuses) refracted return light 715 to other optical components in a receiver (e.g., a light detector of the receiver). Thus, in some embodiments, optical refraction device 706 and mirror 710 are used both to steer transmission light beams to illuminate objects in the FOV and to receive and redirect return light to a receiver. As shown in FIG. 7, optical refraction device 706 and mirror 710 are controlled to oscillate, rather than rotate, about their respective axes. As described above, to enable rotational movements (e.g., rotating clockwise or counterclockwise), the optical component needs to have a large clearance space around it so that it can rotate freely without interfering with other components. To enable oscillation (e.g., oscillate about an axis in a periodical manner within a limited angular range) of optical refraction device 706 and mirror 710, the system does not require a large clearance space. In some embodiments, the required clearance space for enabling oscillation can be significantly reduced (e.g., if the required angular range for oscillation is limited). As a result, the overall dimension of the LiDAR system can be reduced such that the LiDAR system can be made more compact. A compact LiDAR system is oftentimes desired because it can be assembled into a small space of a vehicle or another platform. A compact LiDAR system also does not significantly increase, or does not increase at all, the overall dimension of the vehicle of another platform, therefore rendering it more desirable.

In FIG. 7, optical refraction device 706 can be an optical prism. For example, optical refraction device 706 can have flat and polished surfaces that are configured to refract light. At least one surface of optical refraction device 706 is angled with respect to another surface. For example, at least one surface of optical refraction device 706 is not parallel to its opposing surface. Light can be refracted by the two unparallel surfaces. Different embodiments of optical refraction device 706 may have different geometrical shapes and are described in more detail below. Optical refraction device 706 can be a dispersive prism (e.g., a triangular prism, an Amici prism, a Littrow prism, a Pellin-Broca prism, an Abbe prism, a Grism, a Fery prism, or the like), a beam-splitting prism (e.g., a dichroic prism, a polarizing cube beam splitter, a partially-metallized mirror providing non-polarizing beam splitting, an air gap, or the like), a polarizing prism (e.g., a Nicol prims, a Glan-Foucault prim, a Rochon prim, a Senarmont prism, a Wollaston prism, a Nomarski prim, or the like).

In some embodiments, optical refraction device 706 can be a part of an optical refraction device assembly. The assembly can include, a motor, a position encoder, an actuator, a controller, etc. Similarly, mirror 710 can be a part of a mirror assembly. The mirror assembly can include a motor, a position encoder, an actuator, a mirror controller. These components of the optical refraction device assembly and mirror assembly are described in more detail below. In one embodiment, mirror 710 is a galvanometer mirror.

Figure 8:
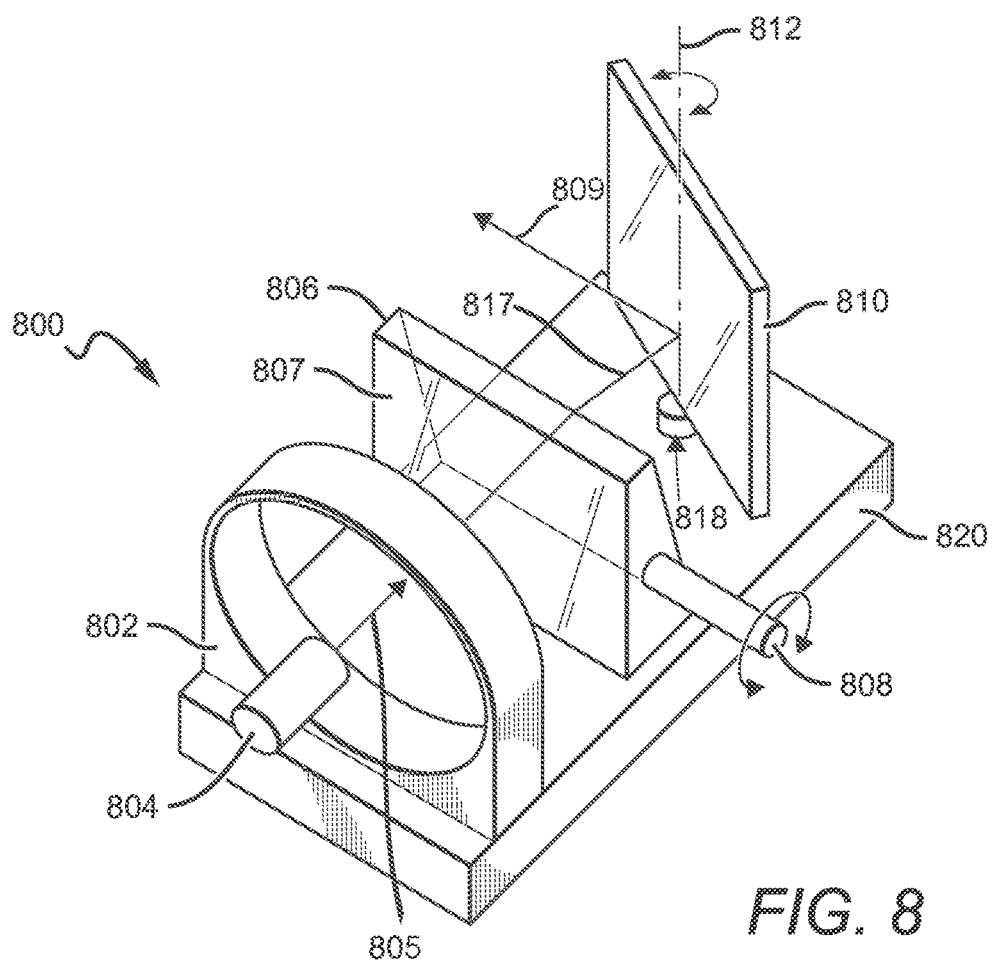
FIG. 8 is a perspective view of a simplified compact LiDAR system that uses an optical refraction device according to some embodiments.

FIG. 8 is a perspective view of a simplified compact LiDAR system 800 that uses an optical refraction device 806 according to some embodiments. As shown in FIG. 8, in some embodiments, system 800 comprises a collection lens 802, a transmitter 804, an optical refraction device 806, a mirror 810, and a mounting mechanism 820. Collection lens 802, transmitter 804, optical refraction device 806, and mirror 810 are the same or similar to collection lens 702, transmitter 704, optical refraction device 706, and mirror 710, respectively. Unlike transmitter 704, in FIG. 8, transmitter 804 is disposed in front of collection lens 802. In some embodiments, collection lens 802 may have an opening (not shown) for passing transmission light beams 805. Transmitter 804 can be disposed in front of, or at least partially in, the opening. The transmission light beams 805 can be directed through the opening in collection lens 802 toward optical refraction device 806.

Similar to those described above of LiDAR system 700, in some embodiments, optical refraction device 806 of LiDAR system 800 is coupled to a first actuator (not shown in FIG. 8) configured to oscillate optical refraction device 806 about an axis along shaft 808. Mirror 810 is coupled to a second actuator (not shown in FIG. 8) configured to oscillate mirror 810 about an axis 812 along shaft 818. The first actuator and the second actuate may be mounted to, for example, mounting mechanism 820. Mounting mechanism 820 can be a discrete component forming the basis of, or mounting at least a part of, one or more of optical refraction device 806 and its shaft 808, the first and second actuators, mirror 810 and its shaft 818, and collection lens 802. Mounting mechanism 820 can also be a part of a mounting mechanism of the entire LiDAR system. In one embodiment, mounting mechanism 820 is a mounting chassis.

When optical refraction device 806 and mirror 810 oscillate, they can be configured to steer light beams both vertically and horizontally to illuminate an object within an FOV. In particular, transmitter 804 directs one or more transmission light beams 805 toward a side surface 807 of optical refraction device 806. Optical refraction device 806 refracts transmission light beams 805 to form refracted light beams 817. Refracted light beams 817 are directed toward mirror 810, which redirects the beams to form transmission light beams 809 to illuminate objects in an FOV. Similar to those described above, in some embodiments, optical refraction device 806 and mirror 810 are also used to receive and redirect return light to collection lens 802. The return light is further redirected to other components (e.g., a photodetectors) of a receiver.

As shown in FIG. 8, optical refraction device 806 and mirror 810 are controlled to oscillate, rather than rotate, about their respective axis. As described above, to enable rotational movements (e.g., rotating clockwise or counterclockwise), the LiDAR system needs to have a large clearance space so that the optical components can rotate freely without interfering with other components. To enable oscillation (e.g., oscillating about an axis in a periodical manner within a limited angular range), optical refraction device 806 and mirror 810 do not require as much space as if they were configured to rotate. In some embodiments, the required clearance space for oscillation can be significantly reduced compared to the required space for rotation. As a result, the overall dimension of the LiDAR system can be reduced such that the LiDAR system become more compact.

Figure 9:
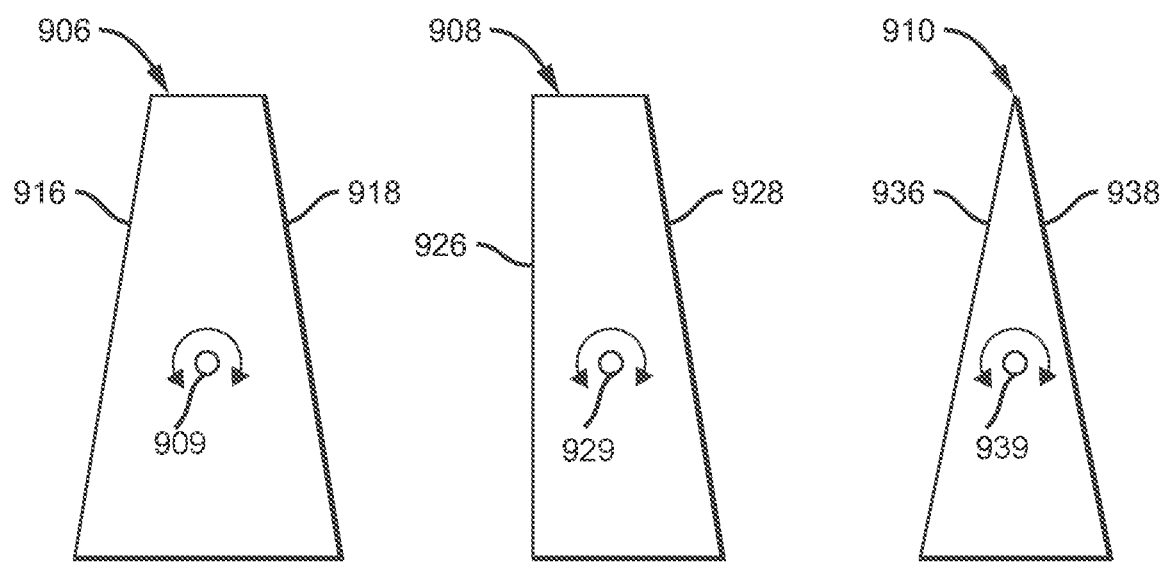
FIG. 9 illustrates side views of different types of optical refraction devices according to some embodiments.

FIG. 9 illustrates side views of various embodiments of optical refraction devices. In FIG. 9, optical refraction devices 906, 908, and 910 are different embodiments that can be used to implement optical refraction devices 706 and/or 806 described above. Each of optical refraction devices 906, 908, and 910 can be a part of an optical refraction device assembly comprising, for example, a prism, a motor shaft, a motor, an actuator, and a position encoder. These components in an optical device assembly are described in more detail below. As shown in FIG. 9, in one embodiment, optical refraction device 906 has two side surfaces 916 and 918. Side surfaces 916 and 918 are not parallel to each other and are referred to as wedged surfaces. FIG. 9 illustrates that side surface 916 and the bottom surface of optical refraction device 906 forms a non-90 degree angle (e.g., a 70 degree angle). Similarly, surface 918 and the bottom surface of optical refraction device 906 also forms a non-90 degree angle (e.g., a 60 degree angle). The two surfaces 916 and 918 are formed such that optical refraction device 906 has a trapezoidal-shaped side surface as shown in FIG. 9, where the top and bottom surfaces are parallel to each other and the two side surfaces 916 and 918 are not parallel to each other. Edges of side surfaces 916 and 918 form the legs of the trapezium; and edges of the top and bottom surfaces form the bases of the trapezium. By configuring the angles of the two side surfaces 916 and 918 with respect to the bottom surface (or the top surface), these two side surfaces 916 and 918 can be configured to refract light beams in a desired refraction angle. As a result, optical refraction device 906 can be properly configured to change the direction of the incident transmission light beams to form output light beams in the desired directions. The desired refraction angle or direction can be calculated using, for example, Snell's law. The output light beams formed by optical refraction device 906 are used for scanning the FOV when optical refraction device 906 oscillates about an axis (e.g., axis 909). In some embodiments, the angles of the two surfaces 916 and 918 with respect to the top or bottom surfaces are configured such that scan range along one dimension (e.g., the vertical dimension) of the LiDAR's FOV is about 40 degrees (e.g., −20 degrees to +20 degrees).

As further shown in FIG. 9, in one embodiment, optical refraction device 908 has side surfaces 926 and 928. Side surface 928 is a wedged surface and side surface 926 is a non-wedged surface. Surfaces 926 and 928 are not parallel to each other. FIG. 9 illustrates that side surface 928 and the bottom surface of optical refraction device 908 form a non-90 degree angle. Side surface 926 and the bottom surface forms a 90-degree angle. The two surfaces 926 and 928 are formed such that optical refraction device 908 has a trapezoidal-shaped side surface with a 90-degree angle, as shown in FIG. 9. Edges of side surfaces 926 and 928 form the legs of the trapezium; and edges of the top and bottom surfaces form the bases of the trapezium. In general, to refract light beams, an optical refraction device requires at least one side surface (e.g., surface 928) being a wedged surface (e.g., the side surface and the bottom/top surface forming a non-90 degree angle). By configuring the angle of surface 928 with respect to the top or bottom surfaces, optical refraction device 908 can be configured to refract light beams in a desired refraction angle. As a result, optical refraction device 908 can be properly configured to change the directions of the transmission light beams to form output light beams in the desired directions. The desired refraction angle or direction can be calculated using, for example, Snell's law. The output light beams are used for scanning the FOV when optical refraction device 908 oscillates about an axis (e.g., axis 929). In some embodiments, the angle of the side surface 928 with respect to the top or bottom surfaces is configured such that the scan range along one dimension (e.g., the vertical dimension) of the LiDAR's FOV is about 10 to 40 degrees.

As further shown in FIG. 9, in one embodiment, optical refraction device 910 has two side surfaces 936 and 938. Side surfaces 936 and 938 are wedged surfaces and are not parallel to each other. FIG. 9 illustrates that surface 936 and the bottom surface of optical refraction device 910 forms a non-90 degree angle (e.g., 70 degrees). Similarly, surface 938 and the bottom surface also forms a non-90 degree angle (e.g., 70 degrees). The two surfaces 936 and 938 are formed such that optical refraction device 910 has a triangle-shaped side surface as shown in FIG. 9. Edges of side surfaces 936 and 938 form the two side edges of the triangle and they intersect each other at the top vertical. By configuring the angles of the two side surfaces 936 and 938 with respect to the bottom surface, these two side surfaces can be configured to refract light beams to form output light beams in a desired refraction angle. As a result, optical refraction device 910 can be properly configured to change the directions of the transmission light beams going into optical refraction device 910 and to form output light beams in the desired directions. The desired refraction angle or direction can be calculated using, for example, Snell's law. The output light beams are used for scanning the FOV when optical refraction device 910 oscillates about an axis (e.g., axis 939). In some embodiments, the angles of the two side surfaces 936 and 938 are configured such that the scan range along one dimension (e.g., the vertical dimension) of the LiDAR's FOV is about 10 to 40 degrees.

FIG. 9 illustrates three different embodiments of optical refraction devices. It is understood that an optical refraction device can have any other desired shapes and/or dimensions. The optical refraction device can be properly configured to perform optical refraction of light beams such that the oscillation of the device causes the transmission light beams to scan a FOV in accordance with the LiDAR scanning requirements. The oscillation of the optical refraction device also enables receiving return light for calculating the distance of the objects in the FOV.

Figure 10:
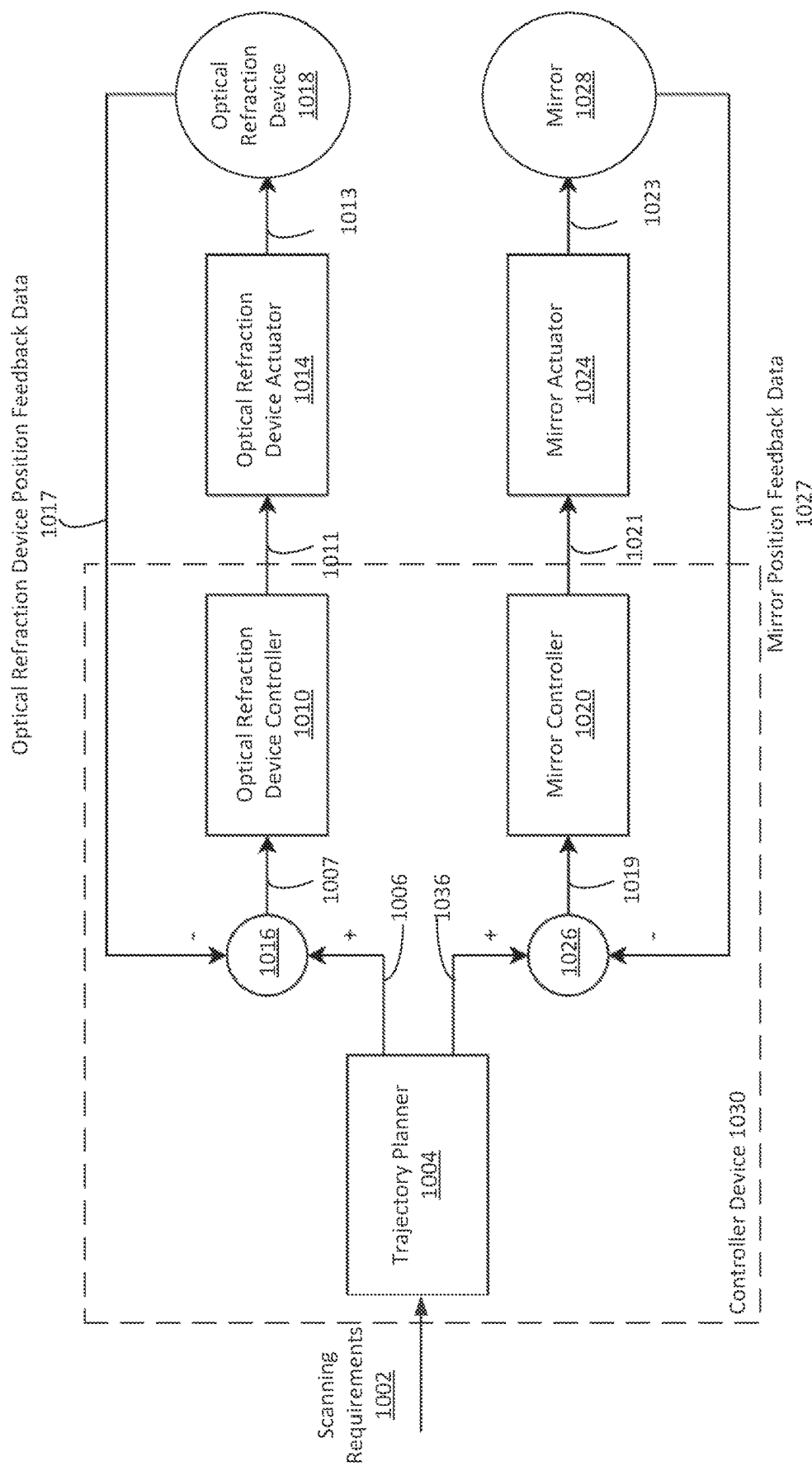
FIG. 10 is a block diagram illustrating the movement control of an optical refraction device and an optical reflection device of a LiDAR system according to some embodiments.

As described above, an optical refraction device (e.g., devices 706 and 806) and a mirror (e.g., mirrors 710 and 810) can be controlled to oscillate about their respective axes in accordance with the scanning requirements of the LiDAR system (e.g., the scanning range, the scanning speed, the resolution, the regions of interest, or the like). FIG. 10 is a block diagram illustrating movement control of an optical refraction device 1018 and a mirror 1028. Optical refraction device 1018 can be used to implement device 706 and/or device 806 described above. Mirror 1028 can be used to implement mirror 710 and/or mirror 810 described above. As shown in FIG. 10, in some embodiments, a LiDAR system includes a trajectory planner 1004, an optical refraction device controller 1010, an optical refraction device actuator 1014, a mirror controller 1020, and a mirror actuator 1024. One or more of these components of the LiDAR system can be implemented by hardware and/or software components of the LiDAR system (e.g., control circuitry 350 shown in FIG. 3). For example, they can be implemented by using one or more microcontroller units (MCU), one or more digital signal processors (DSP), one or more field programmable gate arrays (FPGAs), or the like.

In some embodiments, the movement control of the optical refraction device 1018 and mirror 1028 are performed by determining a movement profile for each. Trajectory planner 1004 receives LiDAR scanning requirements 1002 and determines a movement profile of optical refraction device 1018 and a movement profile of mirror 1028. The scanning requirements 1002 can include, for example, a horizontal scan range; a vertical scan range; a region of interest (ROI) requirement; a scanning frame rate; and/or a scanning pattern requirement. The horizontal scan range specifies the angular range for the horizontal scanning direction (e.g., from about −40 degrees to about +40 degrees). The vertical scan range specifies the angular range for the vertical scanning direction (e.g., from about −20 degrees to about +20 degrees). The ROI requirement specifies the one or more angular range in which a higher scanning resolution is required or preferred. For example, if the entire vertical scan range is from about −20 degrees to about +20 degrees, the ROI requirement may specify that the ROI range is between about −10 degrees to about +10 degrees. Typically, the ROI requirements specify one or more scan ranges corresponding to regions that have a higher interest (e.g., regions likely having more objects such as pedestrians and vehicles). The scanning frame rate relates to the scanning speed of the LiDAR system. By scanning the laser beams along the horizontal and vertical directions, a LiDAR system forms a complete 3D map of the scene of the FOV. Every such map is called a frame. A LiDAR system may have frame rates between, for example, about 10 and about 50 frames per second. The scanning pattern requirement specifies the scanline shape and/or the orientation of the desired pattern.

Based on one or more of these received LiDAR scanning requirements 1002, trajectory planner 1004 determines the movement profile of optical refraction device 1018. For example, if optical refraction device 1018 is configured to enable scanning of the vertical dimension of the FOV, trajectory planner 1004 can determine a movement profile 1006 of optical refraction device 1018 based on one or more of the vertical scan range, the ROI requirement (if any), the scanning frame rate, and/or the scanning pattern requirement. The movement profile 1006 defines an angular position and time relation, which represents the oscillation trajectory of optical refraction device 1018 between a first angular position and a second angular position. First angular position and second angular position indicate the boundaries or end positions of oscillation for optical refraction device 1018. Thus, when optical refraction device 1018 oscillates to either the first angular position or the second angular position, it changes the movement direction. The first angular position and the second angular position of optical refraction device 1018's movement can be used to determine the vertical scanning range. In one example, the first angular position and the second angular position are configured such that the vertical scanning is within a range of about −20 degrees to about +20 degrees. Therefore, the total vertical scanning range is about 40 degrees. The scanning frame rate, ROI requirements, and scanning pattern requirements can be used to determine the speed of movement of the optical refraction device 1018 at any particular time point. For instance, in the ROI region, optical refraction device 1018 can be controlled to scan at a slower rate than that of a non-ROI region, thereby providing higher resolution scan lines. Optical refraction device 1018 can also be controlled to oscillate at a desired speed according to the scanning frame rate requirement. Thus, the movement profile of optical refraction device 1018 includes an angular position-time relation specifying the oscillation trajectory of the optical refraction device 1018 between the first angular position and the second angular position.

Similarly, based on one or more LiDAR scanning requirements 1002, trajectory planner 1004 can determine the movement profiles of mirror 1028. For example, if the mirror 1028 is configured to provide scanning of the horizontal dimension of the FOV, trajectory planner 1004 can determine its movement profile based on one or more of the horizontal scanning range, the ROI requirement (if any), the scanning frame rate, and the scanning pattern requirement. The movement profile of mirror 1028 defines an angular position-time relation, which represents the oscillation trajectory of mirror 1028 between a third angular position and a fourth angular position. The third angular position and fourth angular position indicate the boundaries or end positions of oscillation for mirror 1028. Thus, when mirror 1028 oscillates to either the third angular position or the fourth angular position, it changes its movement direction. The third and fourth angular positions associated with mirror 1028's movement can be used to determine the horizontal scanning range. In one example, the third and fourth angular positions are configured such that the horizontal scanning is within a range of about −40 degrees to about +40 degrees. Therefore, the total horizontal scanning range is about 80 degrees. In one embodiment, the horizontal scanning range is greater than the vertical scanning range because mirror 1028 is configured to have a greater oscillation range than that of optical refraction device 1018. In another embodiment, the vertical scanning range is configured to be greater than the horizontal scanning range. The scanning frame rate, ROI requirements, and scanning pattern requirements can be used to determine the speed of movement of mirror 1028 at any particular time point. For instance, in the ROI region, mirror 1028 can be controlled to scan at a slower rate to provide higher resolution scan lines. Mirror 1028 can also be controlled to oscillate at a desired speed according to the scanning frame rate requirement. Thus, the movement profile of the mirror 1028 includes an angular position and time relation specifying the oscillation trajectory of mirror 1028 between the third angular position and the fourth angular position.

In some embodiments, the movement profiles of optical refraction device 1018 and mirror 1028 are determined independently. Thus, one or more ROI regions can be configured dynamically in both the horizontal and the vertical dimensions of the FOV. For example, the oscillation trajectory of optical refraction device 1018 specifies a first ROI region along the vertical dimension of the FOV. And the oscillation trajectory of mirror 1028 specifies a second ROI region along a horizontal dimension of the FOV. The first ROI region and the second ROI region may or may not overlap. In this manner, the ROI regions can be configured flexibly to include any desired regions in one or both of the horizontal and vertical dimensions of the FOV.

Figure 11:
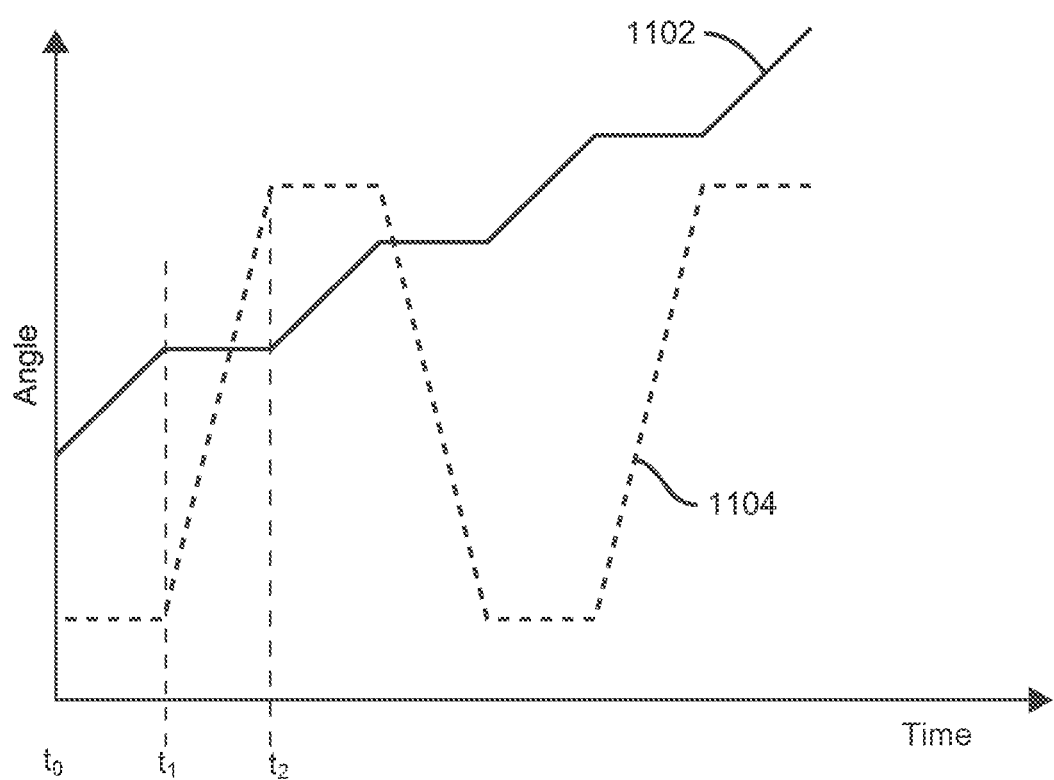
FIG. 11 illustrates movement profiles of an optical refraction device and an optical reflection device according to some embodiments.

FIG. 11 illustrates movement profiles of optical refraction device 1028 and mirror 1028 according to some embodiments. In one embodiment, the movement profile of optical refraction device 1018 is represented by a trajectory 1102. The movement profile of mirror 1028 is represented by a trajectory 1104. Trajectory 1102 provides the angular position of optical refraction device 1018 at any particular time. Trajectory 1104 provides the angular position of mirror 1028 at any particular time. Certain angular positions in trajectory 1102 correspond to end angular positions of the oscillation movement of optical refraction device 1018. For example, the minimum and maximum angles shown in trajectory 1102 may correspond to the two end positions of oscillation. Similarly, certain angular positions in trajectory 1104 (e.g., the minimum and maximum angles) correspond to end angular positions of the oscillation movement of mirror 1028. In the example shown in FIG. 11, mirror 1028 oscillates at a higher speed than optical refraction device 1018. Therefore, if mirror 1028 is used to facilitate scanning in the horizontal dimension and optical refraction device 1018 is used to facilitate scanning in the vertical dimension, there may be multiple horizontal scanlines for a particular vertical angular position. Trajectory 1102 and trajectory 1104 can be used to control the movement of the optical refraction device 1018 and mirror 1028, respectively, such that the oscillation movements of optical refraction device 1018 and mirror 1028 facilitate the generation of a desired scan pattern for covering desired horizontal and vertical scanning ranges. It is understood that all or a part of trajectory 1102 and trajectory 1104 shown in FIG. 11 may be repeated and/or extended in time.

Figure 12:
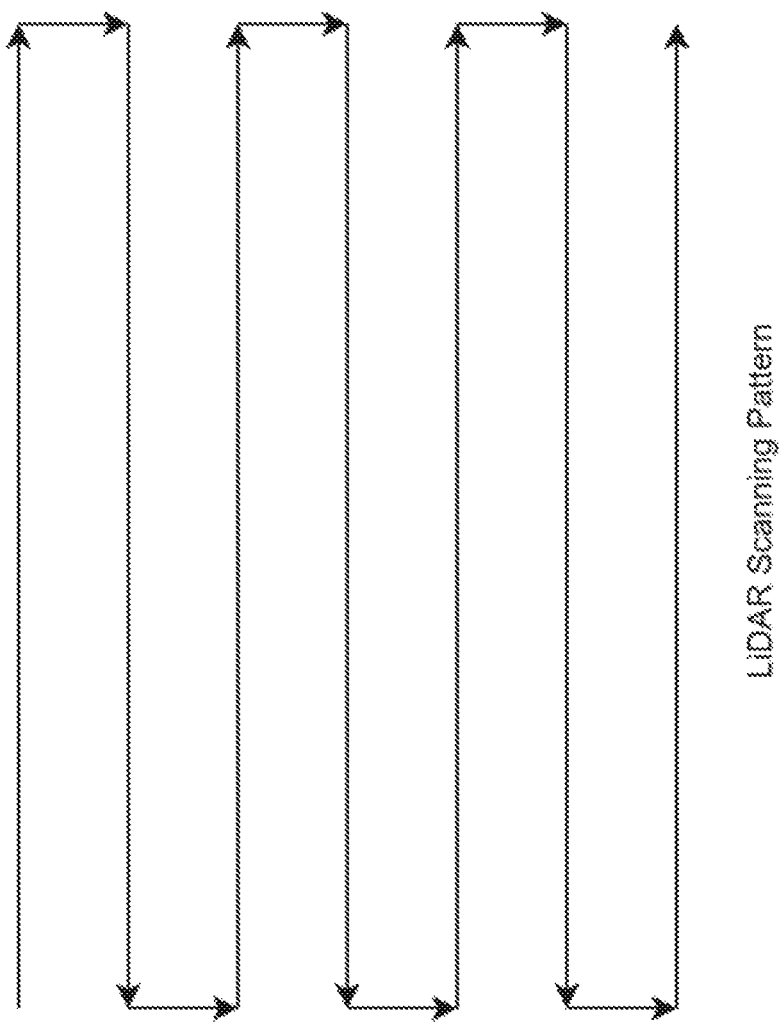
FIG. 12 is a flowchart of a method of controlling the movements of an optical refraction device and an optical reflection device according to some embodiments.

In some embodiments, the scanning pattern of a LiDAR system is required or desired to be horizontally flat or substantially flat. FIG. 12 illustrates such a profile where the scanning pattern has flat scanlines in both the horizontal and vertical dimensions. To obtain such flat scanlines, the movement profiles of optical refraction device 1018 and mirror 1028 are configured such that at any given time, only one of optical refraction device 1018 or mirror 1028 is moving. Referencing back to FIG. 11, as an example, trajectory 1102 shows that between time t0 and t1, optical refraction device 1018 is moving and therefore its angular position changes over time from t0 to t1. Trajectory 1104 shows that between the same time interval t0 and t1, mirror 1028 does not move. Therefore mirror 1028 does not change its angular position between t0 and t1. During time interview t1 to t2, it is the opposite. That is, from time t1 to t2, trajectory 1102 shows that optical refraction device 1018 does not change its angular position, indicating that it is not moving during t1 and t2. Instead, during time interval t1 and t2, trajectory 1104 shows that mirror 1028 changes its angular position, indicating that mirror 1028 is moving. The movement trajectories repeat after time t2. Thus, the combination of trajectory 1102 and trajectory 1104 indicates that he optical refraction device 1018 and mirror 1028 alternate their movements with respect to each other. At any particular time, only one of optical refraction device 1018 and mirror 1028 moves. In this manner, the transmission light beams are steered either horizontally or vertically, but not both, at any particular time. As a result, the LiDAR scan pattern formed by the return light has flat horizontal and flat vertical scanlines, as shown in FIG. 12. In some embodiments, the LiDAR scanning pattern shown in FIG. 12 can represent both the pattern of the transmission light and the pattern of the return light. Light travels at about $3\times10^8$ meters per second. Therefore, within the very short amount of time from the light being transmitted to the return light being received, the scanning system (e.g., the optical refraction device and the mirror) can be approximated to have no movement or negligible movement. As a result, both the transmission light pattern and the return light pattern may be represented similarly using the pattern shown in FIG. 12.

With reference back to FIG. 10, the movement profiles 1006 and 1016 are provided for controlling movements of optical refraction device 1018 and mirror 1028. During operation, the angular positions of optical refraction device 1018 and mirror 1028 may not always be accurately controlled and may have position inaccuracy from time to time. The position inaccuracy may be generated due to many factors such as controller inaccuracy, assembly inaccuracy, optical components manufacturing tolerance, etc. For example, the optical quality of surfaces of the optical refraction device 1018 and mirror 1028 may vary from device to device. Therefore, in some embodiments, there will be differences between the planned angular positions included in the movement profiles determined by trajectory planner 1004 and the actual angular positions of optical refraction device 1018 and/or the mirror 1028. To reduce or eliminate the differences, position feedbacks can be taking into account when generating the control signals using the movement profiles.

As one example, optical refraction device 1018 obtains its angular positions at any particular time using a position encoder. The position encoder can be a rotary position encoder and/or a Hall effect sensor, or any other desired position encoders. For instance, a rotary position encoder can provide the absolute position of the optical refraction device 1018 between 0 degrees to 360 degrees. The absolute position can be used for controlling the optical refraction device 1018. Specifically, the position encoder provides optical refraction device position feedback data 1017 to a processor 1016. Processor 1016 can be implemented by hardware and/or software. It can be a discrete component, a part of the trajectory planner 1004, a part of the controller 1010, and/or a part of any other components in the LiDAR system. It may also be a processor disposed external to the LiDAR system (e.g., in a cloud computing environment). Processor 1016 receives position feedback data 1017 and the movement profile 1006 of optical refraction device 1018. It performs one or more signal processing operations based on the movement profile 1006 and the position feedback data 1017. For example, based on position feedback data 1017, processor 1016 generates one or more adjustment signals 1007. Adjustment signals 1007 can be generated using one or more signal processing operations. Some of these signal processing operations include data sampling, filtering, analog-to-digital conversion, superimposing, data compensation, position control, data transformation, digital-to-analog conversion, subtraction, addition, multiplication, division, and/or any other desired operations. Adjustment signals 1007 represent adjusted movement profiles based on the position feedback 1017. For example, based on the position feedback data 1017, a particular angular position associated with a particular time in movement profile 1006 can be adjusted (increase or decrease) to compensate the angular position inaccuracy of optical refraction device 1018 during operation. As such, the oscillation trajectory of optical refraction device 1018 can be controlled and adjusted in real time during operation. It is understood that in certain circumstances, movement profile 1006 may not need to be adjusted because position feedback data 1017 does not represent any inaccuracy or that the inaccuracy is below a threshold. If there is no inaccuracy or an inaccuracy that is below the threshold, the adjusted signals 1007 may be generated using just the movement profile 1006.

With reference still to FIG. 10, one or more adjustment signals 1007 are provided to optical refraction device controller 1010. Using the adjustment signals 1007, controller 1010 generates control signals 1011 for controlling actuator 1014 of optical refraction device 1018. In some embodiments, control signals 1011 are pulse width modulation (PWM) signals (e.g., 3.3V signals having milliampere current level). These pulse width modulation signals are provided to actuator 1014. Actuator 1014 can be, for example, a driver, which can generate a more powerful signal 1013 to drive the movement of optical refraction device 1018. In one embodiment, actuator 1014 includes an amplifier to amplify the input PWM control signal 1011 to generate a 12V PWM signal having ampere level current. This high-power signal 1013 is then used to drive a motor to oscillate optical refraction device 1018.

Similar to optical refraction device 1018, the position of mirror 1028 may have inaccuracy as well and thus position feedback can also be provided to compensate the position inaccuracy of mirror 1028. Mirror 1028 can obtain its angular positions by using a position encoder. The position encoder can be a rotary position encoder and/or a Hall effect sensor, or any other desired position encoders. The position encoder provides mirror position feedback data 1027 to a processor 1026. Processor 1026 can be implemented by hardware and/or software. It can be a discreet component, a part of the planner 1004, a part of the controller 1020, and/or a part of any other components in the LiDAR system. It may also be a processor disposed external to the LiDAR system (e.g., in a cloud computing environment). In some embodiments, processors 1016 and 1026 are integrated as one unit. In some embodiments, processor 1016 is the same as processor 1026. Processor 1026 receives position feedback data 1027 and the movement profile 1036 of mirror 1028. It performs one or more signal processing operations based on the movement profile 1036 and the position feedback data 1027. For example, based on position feedback data 1027, processor 1026 generates one or more adjustment signals 1019. Adjustment signals 1019 can be generated using one or more signal processing operations. Some of these signal processing operations include data sampling, filtering, analog-to-digital conversion, superimposing, data compensation, position control, data transformation, digital-to-analog conversion, subtraction, addition, multiplication, division, and/or any other desired operations. Adjustment signals 1019 represent adjusted movement profiles based on the position feedback data 1027. For example, based on position feedback data 1027, a particular angular position associated with a particular time in movement profile 1036 can be adjusted to compensate the angular position inaccuracy of mirror 1028 during operation. As such, the oscillation trajectory of mirror 1028 can be controlled and adjusted in real time during operation. It is understood that in certain circumstances, movement profile 1036 may not need to be adjusted because position feedback data 1027 indicates that there is no inaccuracy (or that the inaccuracy or error is below a threshold). If there is no inaccuracy or an inaccuracy that is below the threshold, the adjusted signals 1017 may be generated using just the movement profile 1036.

With reference still to FIG. 10, one or more adjustment signals 1019 are provided to mirror controller 1020. Using adjustment signals 1019, controller 1020 generates control signals 1021 for controlling actuator 1024 of mirror 1028. In some embodiments, the control signals 1021 are pulse width modulation (PWM) signals (e.g., 3.3V signals having milliampere current level). These pulse width modulation signals are provided to actuator 1024. Actuator 1024 can be, for example, a driver, which can generate a more powerful signal 1023 to drive the movement of mirror 1028. In one embodiment, actuator 1024 includes an amplifier to amplify the input PWM control signal 1021 to generate a 12V PWM signal having ampere level current. Signal 1023 has a high power and is then used to drive a motor to oscillate mirror 1028.

In one embodiments, trajectory planner 1004, processors 1016 and 1026, optical refraction device controller 1010, and mirror controller 1020 can be included in a controller device 1030. Controller device 1030 can have one or more processors, memory, and processor-executable instructions stored in the memory. The instructions can be executed by the one or more processors (e.g., 1016 and 1026) to perform one or more steps of the methods described in the present disclosure. Moreover, controller device 1030 may also include storage elements (e.g., memory, hard disk, flash, etc.) for storing movement profiles 1006 and 1016. The controller device 1030 can be implemented using, for example, a micro controller, one or more processors, a field programmable gate array (FPGA), a digital signal processor (DSP), and/or any other computing devices that can implement the methods and processing described herein. In one embodiment, controller device 1030 is a part of control circuitry shown in FIG. 3.

As described above, by controlling optical refraction device 1018 and mirror 1028 to oscillate, rather than rotate, the dimension of the steering mechanism of the LiDAR system can be reduced, thereby making the system more compact. The reduced size of the steering mechanism makes it easy to fit into small spaces in a vehicle or another platform (e.g., a rearview mirror, a vehicle corner, a camera assembly, or the like). Moreover, the movement profiles are configured such that optical refraction device 1018 and mirror 1028 can move in an alternating manner to obtain flat scanlines in both the horizontal and vertical directions. Flat scanlines are oftentimes desired in the subsequent perception process using the LiDAR scanning pattern. Further, by providing position feedbacks for both optical refraction device 1018 and mirror 1028, their respective movement profiles can be adjusted or compensated to improve the position accuracy of optical refraction device 1018 and mirror 1028. In turn, this improves the overall performance of the LiDAR system. It is understood that the blocks in FIG. 10 are for illustration purposes and they can be separated, combined, added, removed, or changed in any desired manner. For example, processors 1016 and 1026 can be combined with their respective controllers 1010 and 1020. A controller and an actuator can also be combined in one assembly or device.

FIG. 13 is a flowchart of an example method 1300 of controlling the movements of an optical refraction device and a mirror, according to some embodiments. In step 1302, a trajectory planner receives the LiDAR scanning requirements. The planner determines the first movement profile of the optical refraction device (step 1304) and determines the second movement profile of the mirror (step 1324). In step 1306, a processor receives position feedback data associated with the optical refraction device. The processor generates (step 1308) first adjustment signals based on the first movement profile and the position feedback data of the optical refraction device. Using the first adjustment signals, an optical refraction device controller generates (step 1310) the first control signals for controlling the optical refraction device actuator. In step 1312, the controller provides the first control signals to the optical refraction device actuator. In step 1314, the optical refraction device actuator drives the optical refraction device to oscillate. The position encoder of the optical refraction device senses (step 1316) the position data of the optical refraction device and provide the position data as feedback. If needed, the process of compensating the optical refraction device position can repeat from step 1306 so that real time compensation can be performed for the optical refraction device during the operation of the LiDAR system.

Similarly, in step 1326, a processor receives position feedback data associated with the mirror. The processor generates (step 1328) the second adjustment signals based on the second movement profile and the position feedback data of the mirror. Using the second adjustment signals, a mirror controller generates (step 1330) the second control signals for controlling the mirror. In step 1332, the controller provides the second control signals to the mirror actuator. In step 1334, the mirror actuator drives the mirror to oscillate. The position encoder of the mirror senses (step 1336) the position data of the mirror and provide the data as feedback. If needed, the process for compensating the mirror position can repeat from step 1326 so that real time compensation can be performed for the mirror during the operation of the LiDAR system.

Various exemplary embodiments are described herein. Reference is made to these examples in a non-limiting sense. They are provided to illustrate more broadly applicable aspects of the disclosed technology. Various changes may be made, and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments.

What is claimed is:

1. A light detection and ranging (LiDAR) scanning system, comprising:
an optical refraction device coupled to a first actuator configured to oscillate the optical refraction device;
a mirror optically coupled to the optical refraction device and coupled to a second actuator configured to oscillate the mirror; and
one or more controllers communicatively coupled to the first and second actuators, the one or more controllers being configured to control oscillation of the optical refraction device and oscillation of the mirror to:
steer one or more light beams both vertically and horizontally to illuminate one or more objects within a field-of-view, obtain return light, the return light being generated based on the steered one or more light beams illuminating the one or more objects within the field-of-view, and redirect the return light to a collection lens disposed in the LiDAR scanning system.

2. The system of claim 1, wherein the optical refraction device is an optical prism.

3. The system of claim 2, wherein the optical prism comprises at least one of:
   a dispersive prism,
   a beam-splitting prism, or
   a polarizing prism.

4. The system of claim 2, wherein the optical prism comprises two side surfaces configured to refract the one or more light beams.

5. The system of claim 1, further comprising a transmitter, wherein the optical refraction device is disposed between the transmitter and the mirror, and wherein the optical refraction device refracts the one or more light beams to form refracted light beams and directs the refracted light beams to the mirror.

6. The system of claim 1, further comprising a planner configured to determine a first movement profile of the optical refraction device and a second movement profile of the mirror;
   wherein the one or more controllers are configured to perform:
      controlling the first actuator to oscillate the optical refraction device based on the first movement profile of the optical refraction device; and
      controlling the second actuator to oscillate the mirror based on the second movement profile of the mirror.

7. The system of claim 6, wherein determining the first movement profile of the optical refraction device and the second movement profile of the mirror comprises:
   receiving one or more LiDAR scanning requirements;
   determining the first movement profile of the optical refraction device based on at least one of the one or more LiDAR scanning requirements; and
   determining the second movement profile of the mirror based on at least one of the one or more LiDAR scanning requirements.

8. The system of claim 7, wherein the one or more LiDAR scanning requirements comprises at least one of:
   a horizontal scan range;
   a vertical scan range;
   a region of interest (ROI) requirement;
   a scanning frame rate; and
   a scanning pattern requirement.

9. The system of claim 6, wherein determining the first movement profile of the optical refraction device and the second movement profile of the mirror comprises:
   determining a first trajectory of the optical refraction device and a second trajectory of the mirror, wherein a combination of the first trajectory and the second trajectory represents alternating movements of the optical refraction device and the mirror with respect to each other.

10. The system of claim 6, wherein the first movement profile of optical refraction device comprises an angular position and time relation representing an oscillation trajectory of the optical refraction device between a first angular position and a second angular position.

11. The system of claim 6, wherein the second movement profile of optical refraction device comprises an angular position and time relation representing an oscillation trajectory of the mirror between a third angular position and a fourth angular position.

12. The system of claim 6, wherein controlling the first actuator to oscillate the optical refraction device based on the first movement profile of the optical refraction device comprises:
   receiving position feedback data associated with the optical refraction device; and
   generating one or more first adjustment signals based on the first movement profile and the position feedback data associated with the optical refraction device.

13. The system of claim 12, further comprising:
   generating, based on the one or more first adjustment signals, one or more first control signals for controlling the first actuator to oscillate the optical refraction device; and
   providing the one or more first control signals to control the first actuator.

14. The system of claim 6, wherein controlling the second actuator to oscillate the mirror based on the second movement profile of the mirror comprises:
   receiving position feedback data associated with the mirror; and
   generating one or more second adjustment signals based on the second movement profile and the position feedback data associated with the mirror.

15. The system of claim 14, further comprising:
   generating, based on the one or more second adjustment signals, one or more second control signals for controlling the second actuator to oscillate the mirror; and
   providing the one or more second control signals to control the second actuator.

16. The system of claim 1, wherein the optical refraction device is an optical prism, the optical prism being a part of an optical refraction device assembly, the optical refraction device assembly further comprising:
   a first motor; and
   a prism position encoder configured to provide position feedback data associated with the prism.

17. The system of claim 1, wherein the mirror is a part of a mirror assembly, the mirror assembly further comprising:
   a second motor; and
   a mirror position encoder configured to provide position feedback data associated with the mirror.

18. A method for controlling a light detection and ranging (LiDAR) scanning system, the method being performed by one or more processors and memory, the method comprising:
   controlling a first actuator to oscillate an optical refraction device based on a first movement profile of the optical refraction device; and
   controlling a second actuator to oscillate a mirror based on a second movement profile of the mirror, wherein the optical refraction device and the mirror are controlled to:
      steer one or more light beams both vertically and horizontally to illuminate one or more objects within a field-of-view,
      obtain return light, the return light being generated based on the steered one or more light beams illuminating the one or more objects within the field-of-view, and
      redirect the return light to a collection lens disposed in the LiDAR scanning system.

19. The method of claim 18, further comprising determining the first movement profile of the optical refraction device and the second movement profile of the mirror.

20. The method of claim 19, wherein determining the first movement profile of the optical refraction device and the second movement profile of the mirror comprises:
receiving the one or more LiDAR scanning requirements;
determining the first movement profile of the optical refraction device based on at least one of the one or more LiDAR scanning requirements; and
determining the second movement profile of the mirror based on at least one of the one or more LiDAR scanning requirements.

21. The method of claim 20, wherein determining the first movement profile of the optical refraction device and the second movement profile of the mirror comprises:
determining a first trajectory of the optical refraction device and a second trajectory of the mirror, wherein a combination of the first trajectory and the second trajectory represents alternating movements of the optical refraction device and the mirror with respect to each other.

22. The method of claim 18, wherein controlling the first actuator to oscillate the optical refraction device based on the first movement profile of the optical refraction device comprises:
receiving position feedback data associated with the optical refraction device; and
generating one or more first adjustment signals based on the first movement profile and the position feedback data associated with the optical refraction device.

23. The method of claim 22, further comprising:
generating, based on the one or more first adjustment signals, one or more first control signals for controlling the first actuator to oscillate the optical refraction device; and
providing the one or more first control signals to control the first actuator.

24. The method of claim 18, wherein controlling the second actuator to oscillate the mirror based on the second movement profile of the mirror comprises:
receiving position feedback data associated with the mirror; and
generating one or more second adjustment signals based on the second movement profile and the position feedback data associated with the mirror.

25. The method of claim 24, further comprising:
generating, based on the one or more second adjustment signals, one or more second control signals for controlling the second actuator to oscillate the mirror; and
providing the one or more second control signals to control the second actuator.

26. A non-transitory computer readable medium storing processor-executable instructions comprising instructions which, when executed by one or more processors of an electronic device, cause the electronic device to perform processing comprising:
controlling a first actuator to oscillate an optical refraction device based on a first movement profile of the optical refraction device; and
controlling a second actuator to oscillate a mirror based on a second movement profile of the mirror, wherein the optical refraction device and the mirror are controlled to:
steer one or more light beams both vertically and horizontally to illuminate an object within a field-of-view,
obtain one or more returning light pulses, the one or more returning light pulses being generated based on the steered one or more light beams illuminating an object within the field-of-view, and
redirect the one or more returning light pulses to a collection lens disposed in the LiDAR scanning system.

27. A vehicle comprising a light detection and ranging (LiDAR) scanning system, the LiDAR system comprising:
an optical refraction device coupled to a first actuator configured to oscillate the optical refraction device;
a mirror optically coupled to the optical refraction device and coupled to a second actuator configured to oscillate the mirror; and
one or more controllers communicatively coupled to the first and second actuators, the one or more controllers being configured to control oscillation of the optical refraction device and oscillation of the mirror to:
steer one or more light beams both vertically and horizontally to illuminate one or more objects within a field-of-view,
obtain return light, the return light being generated based on the steered one or more light beams illuminating the one or more objects within the field-of-view, and
redirect the return light to a collection lens disposed in the LiDAR scanning system.

28. The system of claim 1, wherein the one or more controllers are configured to control oscillation of the optical refraction device and oscillation of the mirror to redirect the return light to the collection lens by:
forming, by the optical refraction device, refracted return light based on the return light; and
redirecting the refracted return light to the collection lens, the collection lens being operative to direct the refracted return light to a light detector disposed in the LiDAR scanning system.

* * * * *